United States Patent [19]

Kikuchi et al.

[11] Patent Number: 5,236,337
[45] Date of Patent: Aug. 17, 1993

[54] WEIGHER APPARATUS FOR MEASURING CAN TYPE WORKS OR THE LIKE IN STANDING POSTURE ON PRODUCT LINE

[75] Inventors: Kunio Kikuchi, Minamiashigara; Kazuhiko Horikoshi, Atsugi, both of Japan

[73] Assignee: Anritsu Corporation, Tokyo, Japan

[21] Appl. No.: 831,188

[22] Filed: Feb. 5, 1992

[30] Foreign Application Priority Data

Feb. 26, 1991 [JP] Japan .................................. 3-53882
Jun. 28, 1991 [JP] Japan ................................ 3-185663

[51] Int. Cl.⁵ .......................................... G01G 13/00
[52] U.S. Cl. .......................................... 177/52; 177/54; 177/145; 198/480.1; 198/959
[58] Field of Search ............... 198/470.1, 480.1, 959; 209/523, 592, 593; 177/52, 54, 55, 145

[56] References Cited

U.S. PATENT DOCUMENTS

| | | | |
|---|---|---|---|
| 767,394 | 8/1904 | Doble | 177/55 |
| 782,874 | 2/1905 | Pennock | 177/54 |
| 2,098,260 | 11/1937 | Smith | 177/52 |
| 2,308,154 | 1/1943 | Carter | 198/470.1 X |
| 2,359,786 | 10/1944 | Pechy | 177/52 |
| 2,612,254 | 9/1952 | Carter | 198/470.1 |
| 2,702,120 | 2/1955 | Nordquist | 209/593 X |
| 2,781,995 | 2/1957 | Magnuson et al. | 177/54 |
| 2,826,289 | 3/1958 | McBurney et al. | 198/480.1 X |
| 3,162,258 | 12/1964 | Schmidt | 177/52 |
| 3,333,648 | 8/1967 | Dodd | 177/55 |
| 4,122,940 | 10/1978 | Hoffmann | 198/504 |
| 4,168,773 | 9/1979 | Thiel et al. | 198/470.1 X |
| 4,344,493 | 8/1982 | Salmonsen et al. | 177/52 |
| 4,512,456 | 4/1985 | Peyton | 198/470.1 |
| 4,596,107 | 6/1986 | Pfleger, Sr. | 209/523 X |
| 4,624,098 | 11/1986 | Trendel | 198/480.1 X |
| 4,938,337 | 7/1990 | Jowitt et al. | 198/470.1 X |
| 4,972,882 | 11/1990 | Kohashi | 177/55 X |
| 5,046,599 | 11/1991 | Hamano | 198/480.1 X |

FOREIGN PATENT DOCUMENTS

| | | |
|---|---|---|
| 0253929 | 1/1988 | European Pat. Off. |
| 1174453 | 12/1969 | United Kingdom |
| 2160985 | 1/1986 | United Kingdom |
| WO89/05444 | 6/1989 | World Int. Prop. O. |

*Primary Examiner*—Benjamin R. Fuller
*Assistant Examiner*—R. W. Gibson
*Attorney, Agent, or Firm*—Frishauf, Holtz, Goodman & Woodward

[57] ABSTRACT

A conveying section is engaged with works to be weighed to sequentially convey the works at predetermined intervals along a substantially arcuated path. An engagement releasing section sequentially releases engagement between the conveying section and one of the works at a predetermined region substantially equal to one of the predetermined intervals of convey midway along the arcuated path of the conveying section. A conveyor section is linearly arranged to oppose the predetermined region on the arcuated path on which engagement between the conveying section and the one of the works is released by the engagement releasing section. The conveyor section linearly and sequentially conveys the one of the works released from the conveying section. A weighing section sequentially measures weight of the one of the works while the one the works released from the conveying section is linearly conveyed by the conveyor section.

8 Claims, 21 Drawing Sheets

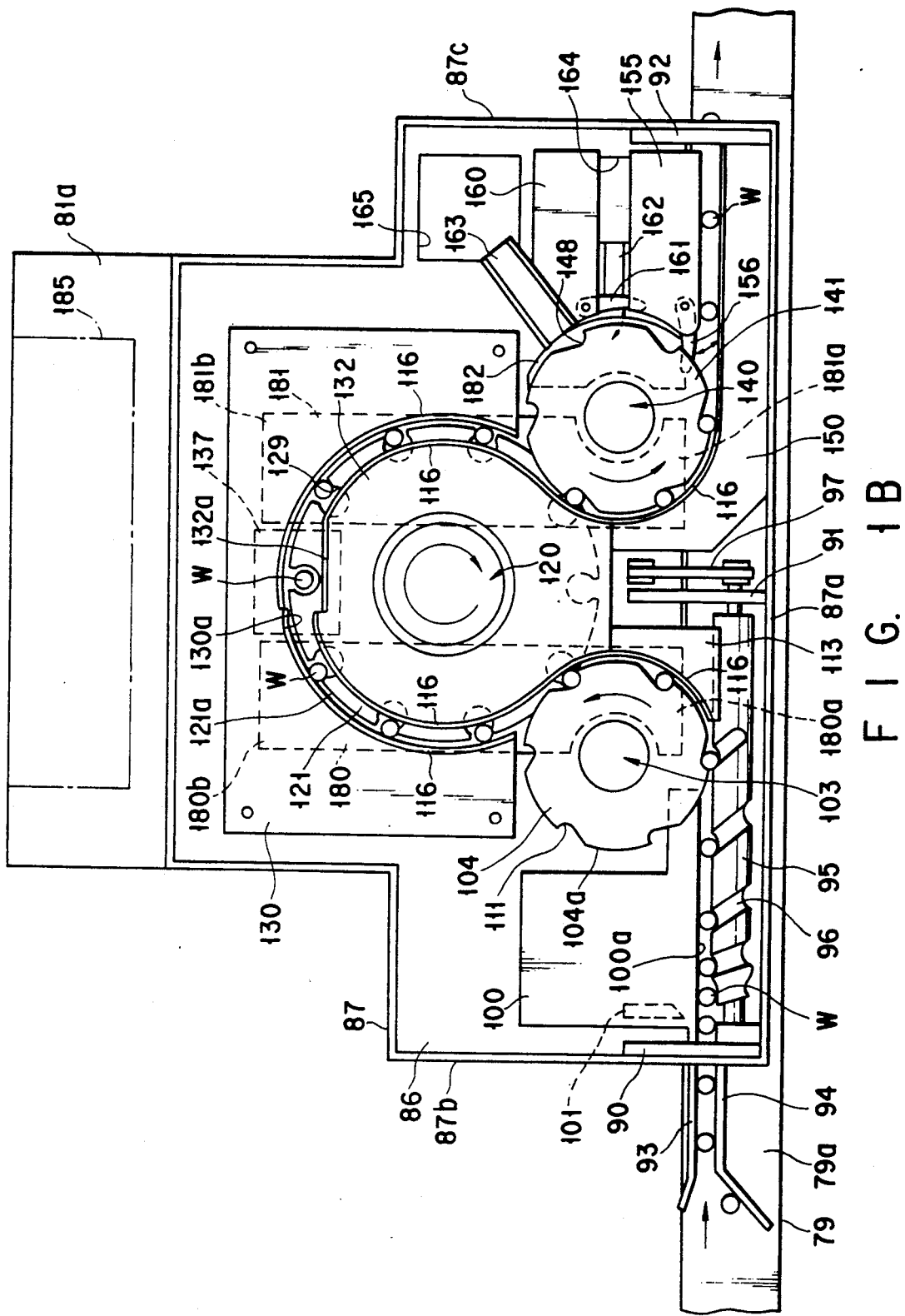

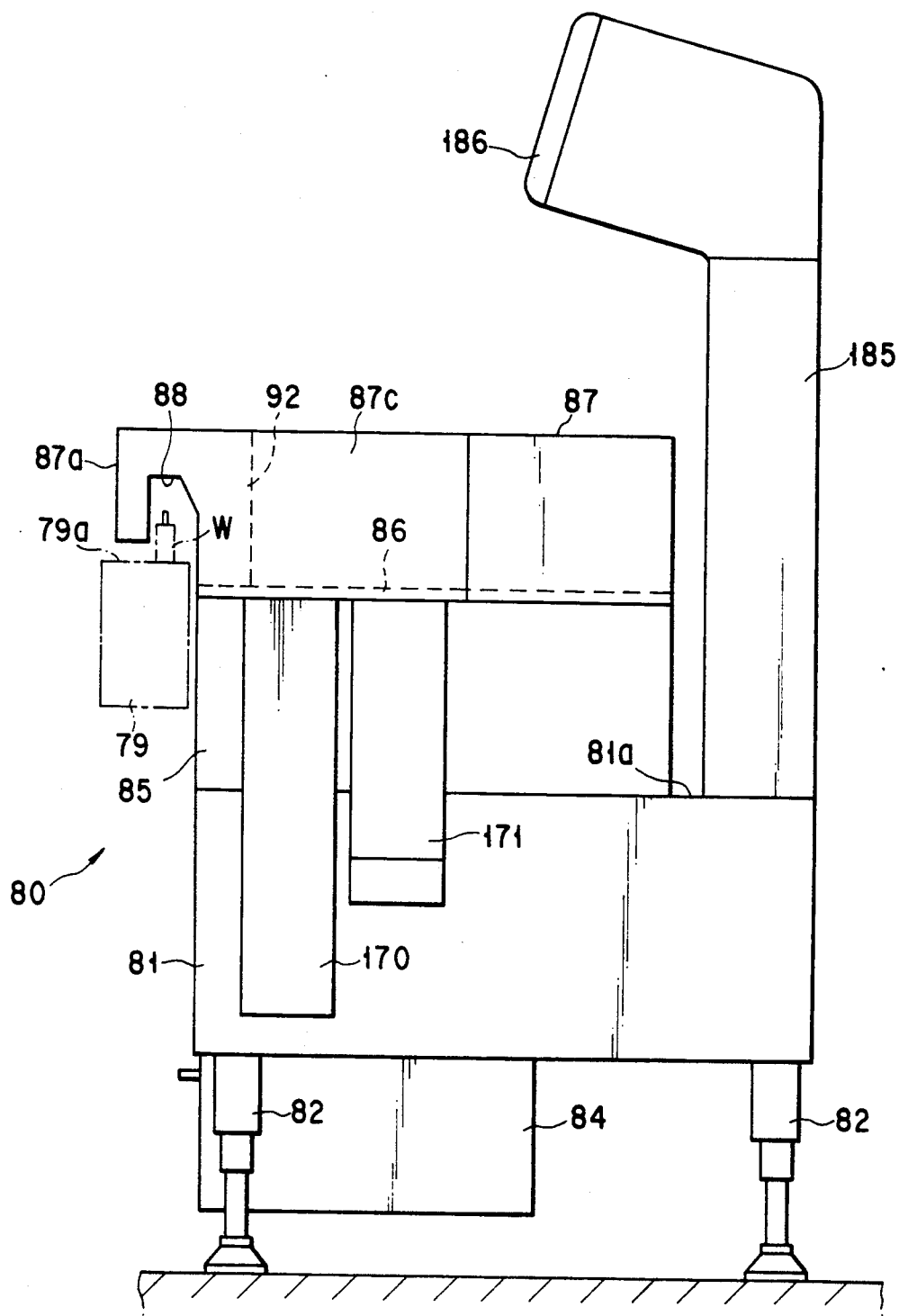
F I G. 3

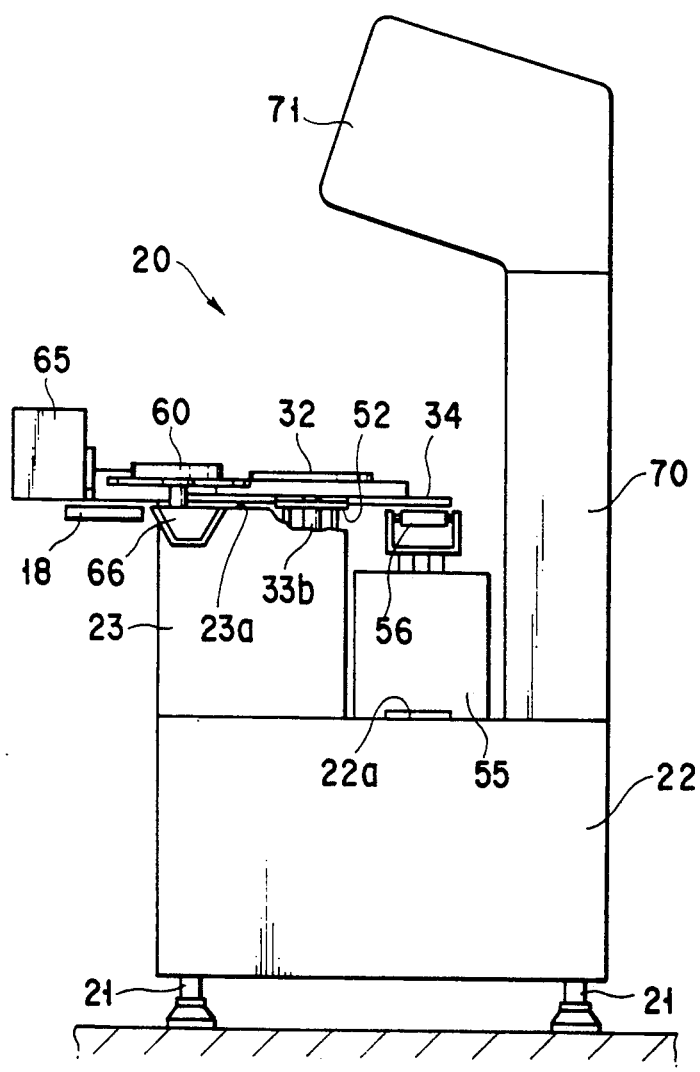
F I G. 13

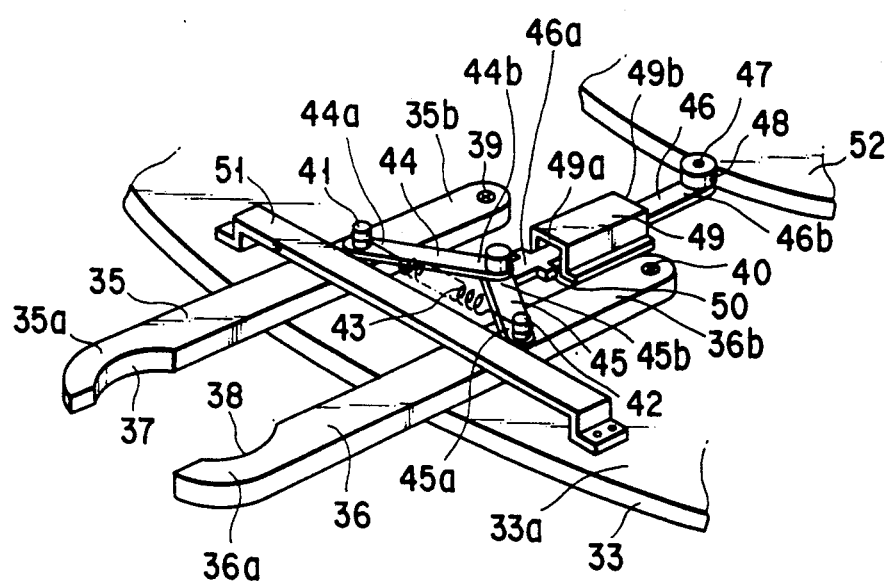
F I G. 15

WEIGHER APPARATUS FOR MEASURING CAN TYPE WORKS OR THE LIKE IN STANDING POSTURE ON PRODUCT LINE

BACKGROUND OF THE INVENTION
1. Field of the Invention

The present invention relates to a weigher apparatus for measuring can type works or the like in standing posture on a product line and, more particularly, to a weigher apparatus for weighing cans, conveyed by a conveyor, by transferring them onto a weighing conveyor.

2. Description of the Related Art

As shown in FIG. 19, when works such as aerosol cans are to be weighed while they are conveyed on a product line, a conventional weigher apparatus 4 has been used. In this weigher apparatus 4, a work conveyed by a conveyor 1 is transferred onto a weighing conveyor 2 arranged along a conveyor path continuous with the conveyor 1, and the weight of the work is measured on the basis of a signal from a weigher 3 while the work is conveyed on the weighing conveyor 2.

In a weigher apparatus of this type, in which the weighing conveyor 2 is directly connected to the conveyor 1, if works conveyed by the conveyor 1 are not spaced at predetermined intervals or more, two or more works are simultaneously placed on the weighing conveyor 2, and hence weighing by the weighing conveyor 2 cannot be properly performed.

For this reason, a weigher apparatus of another type has also been realized. In this weigher apparatus, conveyed works are transferred onto a weighing conveyor at regular intervals, and weighed works are unloaded at regular intervals.

FIG. 20 is a plan view showing a schematic arrangement of a conventional weigher apparatus of this type. In a weigher apparatus 10, a load conveyor 11, a weighing conveyor 12, and an unload conveyor 13 are arranged in a line. Works which are conveyed by the load conveyor 11 at irregular intervals are engaged with notched portions 15 formed in the outer peripheral portion of a first rotating carrier 14 at equal intervals so as to be rotated/moved to the load side of the weighing conveyor 12.

A work W which is moved to the load position of the weighing conveyor 12 is conveyed on the weighing conveyor 12 while it is guided by a linear guide plate 12a. The work which is weighed during this convey is rotated/moved onto the unload conveyor 13 while it is engaged with a notched portion 17 of a second rotating carrier 16.

The first and second rotating carriers 14 and 16 are so-called star-wheels, whose rotational speeds are set to be equal. The rotational phase of the notched portions of the first rotating carrier 1 is shifted from that of the second rotating carrier 16 by a period of time required to convey a work on the weighing conveyor 12.

With this arrangement, the intervals at which works are loaded on the weighing conveyor 12 are predetermined intervals determined by the rotational speed of the first rotating carrier 14, and works are unloaded from the weigher apparatus 10 at predetermined intervals.

As in this weigher apparatus 10, however, if the convey direction of the weighing conveyor 12 is substantially perpendicular to the direction in which a work is loaded on the weighing conveyor 12 by the first rotating carrier 14, the loaded work may be caught by the conveyor belt of the weighing conveyor 12 to fall or sway.

Especially in a case where works filled with liquids, such as can type works, are to be weighed, the contents of the works are swayed due to this rapid change in convey direction, resulting in a considerable deterioration in weighing precision.

In addition, this phenomenon becomes more conspicuous with an increase in rotational speed of the first rotating carrier 14 and in convey speed of the weighing conveyor 12, interfering with an increase in overall weighing speed.

In order to solve this problem, the weighing conveyor 12 may be arranged along the common tangent line of the first and second rotating carriers 14 and 16. In this case, however, the convey length of the weighing conveyor 12 must be increased by an amount corresponding to a convey length within which a work transferred onto the weighing conveyor 12 is in contact with the notched portion 15 and cannot be weighed. This makes it impossible to increase the weighing speed.

SUMMARY OF THE INVENTION

It is, therefore, an object of the present invention to provide a new and improved weigher apparatus for measuring can type works or the like in standing posture on a product line, which can improve the weighing precision and increase the weighing speed.

According to a first aspect of the present invention, there is provided a weigher apparatus comprising:

conveying means which is engaged with works to be weighed to sequentially convey the works at predetermined intervals along a substantially arcuate path;

engagement releasing means for sequentially releasing engagement between the conveying means and one of the works at a predetermined region substantially equal to one of the predetermined intervals of convey midway along the arcuate path of the conveying means;

conveyor means, arranged linearly to oppose the predetermined region on the arcuate path on which engagement between the conveying means and the one of the works is released by the engagement releasing means, for linearly and sequentially conveying the one of the works released from the conveying means; and weighing means for sequentially measuring weight of the one of the works while the one of the works released from the conveying means is linearly conveyed by the conveyor means.

In order to achieve the above object, according to a second aspect of the present invention, there is provided a weigher apparatus comprising:

a loading mechanism for loading works conveyed on a conveyor to one side of the conveyor at predetermined intervals along a guide path which is in contact with a convey direction of the conveyor;

a weighing conveyor, arranged on the one side of the conveyor, for sequentially weighing the one of the works while the one of the works is conveyed from one end to the other end thereof; and a rotating carrier for sequentially receiving the works, loaded along the guide path of the loading mechanism, at an outer peripheral portion thereof, conveying the works along an endless convey path which is substantially in contact with the guide path and a convey path of the weighing conveyor, and sequentially loading one of the the works onto one end of the weighing conveyor.

With this arrangement, in the weigher apparatus according to the second aspect of the present invention, a work which is conveyed on the conveyor is guided to a side of the conveyor along the guide path which is substantially in contact with the convey path of the conveyor. The rotating carrier receives the work, loaded along the guide path, at the outer peripheral portion, conveys the work along the convey path which is in contact with the guide path and the convey path of the weighing conveyor, and loads the work to one end of the weighing conveyor. The weighing conveyor conveys the work, loaded to one end, to the other end while weighing the work.

Furthermore, in order to achieve the above object, according to a third aspect of the present invention, there is provided a weigher apparatus for transferring works, which are conveyed on a conveyor, outside the conveyor to sequentially weigh the works, and returning the weighed works onto the conveyor, comprising:

a weighing conveyor, having a convey path discontinuous with the convey path of the conveyor, for sequentially weighing weight of one of the works during convey;

a first guiding mechanism for guiding the works to one side of the conveyor at predetermined intervals along a guide path continuous with the convey path of the conveyor;

a rotating clamping member arranged between the first guiding mechanism and the weighing conveyor and having clamping arms formed on an outer peripheral portion thereof, the clamping arms being capable of clamping and releasing the works, and the rotating clamping member rotating/moving the clamping arms along a path of rotation which connects the guide path of the first guiding mechanism to the convey path of the weighing conveyor; and a second guiding mechanism for guiding the works onto the conveyor along a guide path continuous with the path of rotation of the clamping arms which are rotated/moved from the weighing conveyor to the conveyor, wherein the works clamped by the clamping arms rotated/moved to a position in contact with the guide path of the first guiding mechanism are released at a load position of the weighing conveyor, and the weighed works clamped at an unload position of the weighing conveyor are released at a position in contact with the guide path of the second guiding mechanism.

In the weigher apparatus according to the third aspect, a work which is conveyed on the conveyor is guided to the outside of the conveyor by the first guiding mechanism and is rotated/moved to the load position of the weighing conveyor while it is clamped by the clamping arm. The work released from the clamping arm at the load position of the weighing conveyor is conveyed on the weighing conveyor and is clamped by the clamping arm again to be rotated/moved to the second guiding mechanism. The work released from the clamping arm at the second guiding mechanism is returned onto the conveyor by the second guiding mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1B is an enlarged view showing part of the arrangement in FIG. 1A;

FIG. 3 is a side view showing the arrangement of the first embodiment;

FIG. 13 is a side view of the second embodiment;

FIG. 15 is an enlarged perspective view of a main part of the second embodiment;

DETAILED DESCRIPTION OF THE PREFERRED EMBODIMENTS

Figure 1A:
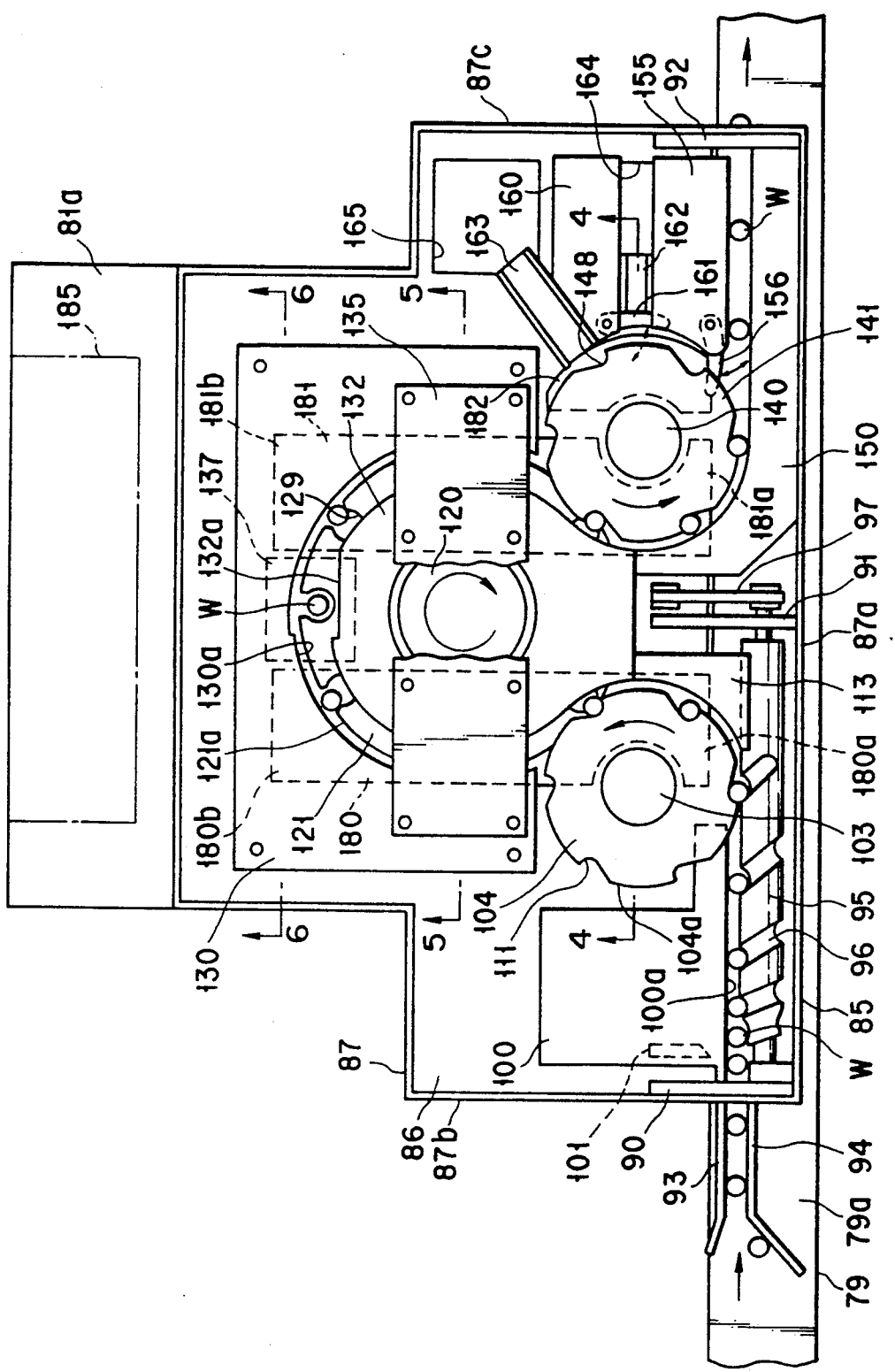
FIG. 1A is a plan view showing the arrangement of the first embodiment of the present invention.

Reference will now be made in detail to the presently preferred embodiments of the invention as illustrated in the accompanyings, in which like reference characters designate like or corresponding parts throughout the several drawings.

The first embodiment of the present invention will be described first with reference to FIGS. 1A to 9B.

Figure 2:
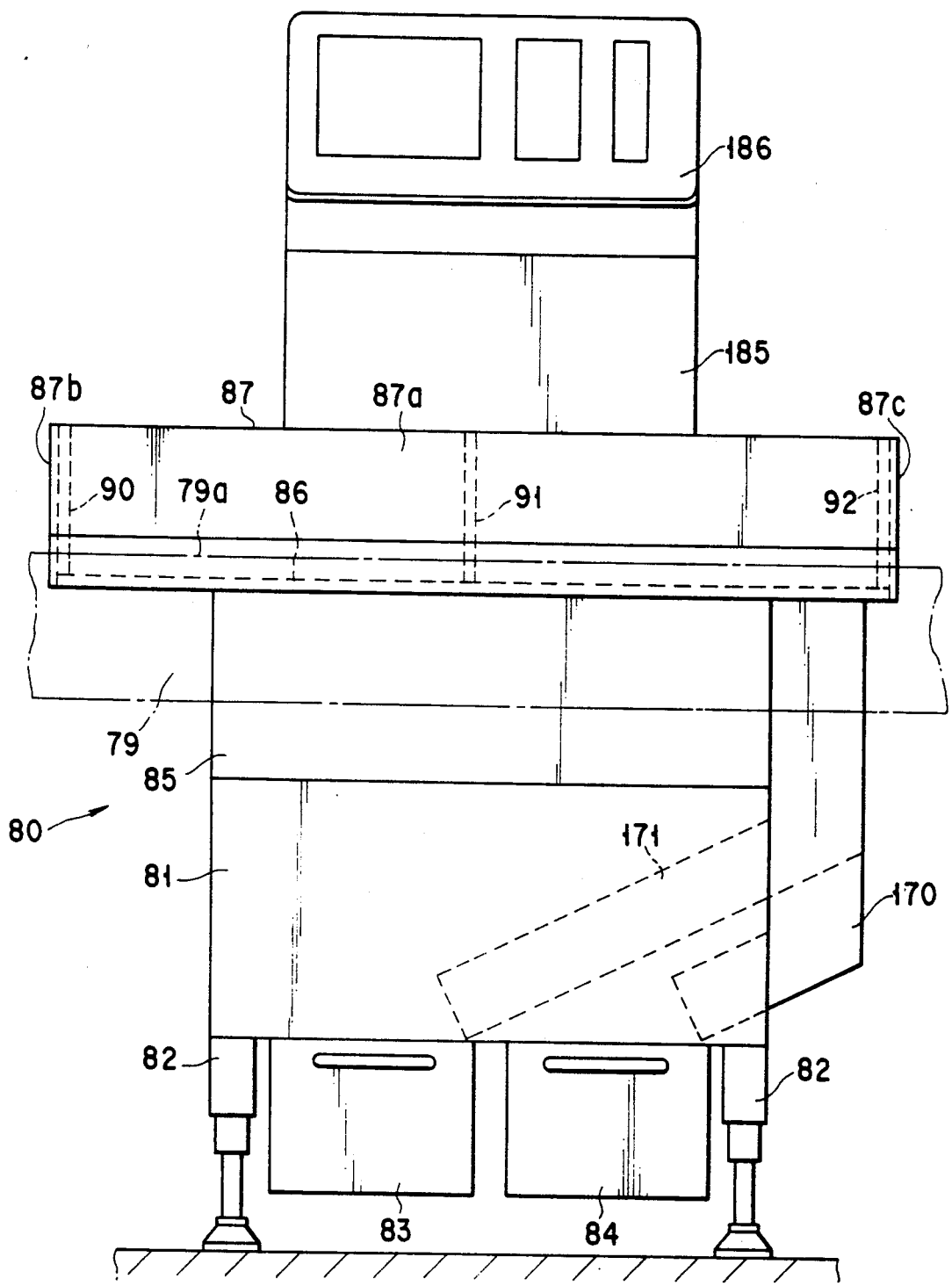
FIG. 2 is a front view showing the arrangement of the first embodiment.

FIG. 1A is a plan view showing a weigher apparatus 80 of the first embodiment, in which works such as aerosol cans, each having a diameter of about 20 mm and a height of about 70 mm, are loaded on a weighing conveyor by means of notched portions formed in the outer peripheral portion of a rotating carrier. FIG. 2 is a front view of the apparatus. FIG. 3 is a side view of the apparatus. Note that FIG. 1B is an enlarged view showing part of the apparatus in FIG. 1A in detail.

A base 81 of the weigher apparatus 80 is supported by four height-adjustable legs 82. A hollow portion is formed in the base 81. Defective work cases 83 and 84 are attached to the lower surface of the base 81 to respectively store defective works discharged from discharge chutes 170 and 171 (to be described later).

A driving housing 85 is arranged on an upper surface 81a of the base 81 to be adjacent to a line conveyor 79. In the driving housing 85, a driving unit (see FIG. 7) and a weighing conveyor 137 (to be described later) are arranged. The driving unit serves to drive a rotating rod 95, first and second rotating guide members 103 and 140, and a rotating carrier 120 (all of which will be described later) through a belt.

A T-shaped flat base plate 86 is fixed on the upper surface of the driving housing 85, and a frame plate 87 is mounted around the base plate 86.

A front surface portion 87a of the frame plate 87 extends over the line conveyor 79. Notched portions 88 are formed in two side surfaces 87b and 87c of the frame plate 87 to allow works to pass therethrough. Note that this front surface portion 87a is internally supported by support plates 90, 91, and 92.

Guide plates 93 and 94 for guiding a work W, conveyed on the line conveyor 79, into the frame plate 87 are mounted on the left side surface 87b of the frame plate 87.

A spiral groove 96 is formed in the surface of the rotating rod 95 mounted between the support plates 90 and 91. The spiral groove 96 is engaged with the work W. A belt 97 coupled to the driving mechanism (not shown) in the driving housing 85 is looped around one end portion of the rotating rod 95. With this arrangement, when the belt 97 is driven, the rotating rod 95 is rotated and the work W engaged with the spiral groove 96 is moved toward the support plate 91.

Note that a loading operation regulating unit 100 is arranged on the upper surface of the base plate 86 on the support plate 90 side. The loading operation regulating unit 100 has a guide surface 100a for guiding the work W loaded by the rotating rod 95. When an abnormality is caused or zero-point calibration of the weighing conveyor 137 is performed, the loading operation regulating unit 100 moves a gate plate 101 toward the rotating rod 95 by means of an internal air cylinder (not shown) to regulate loading of a work.

The first rotating guide member 103 is arranged between the loading operation regulating unit 100 and the support plate 91 to guide the works W, loaded by the rotating rod 95, sideways from the line conveyor 79 at predetermined intervals.

Figure 4:
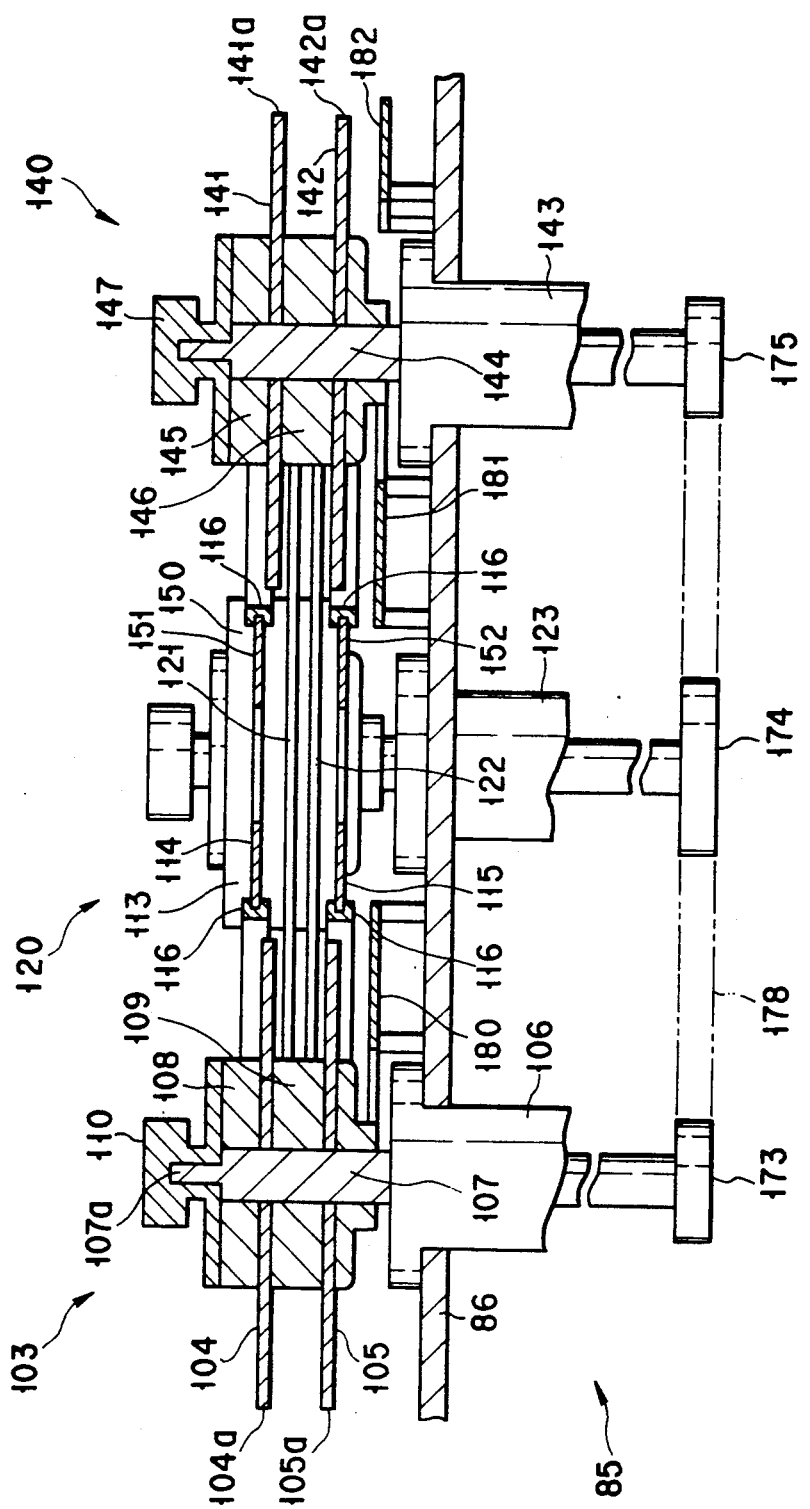
FIG. 4 is an enlarged sectional view taken along a line 4—4 in FIG. 1A.

As shown in FIG. 4, the first rotating guide member 103 has two resin guide disks 104 and 105, which are vertically arranged. The two guide disks 104 and 105 are fitted on a rotating shaft 107 through spacers 108 and 109. The rotating shaft 107 extends from a bearing 106 fixed to the base plate 86.

Note that a clamping member 110 is mounted on a threaded distal end portion 107a of the rotating shaft 107.

Six J-shaped notched portions 111 to be respectively engaged with the surfaces of the works W are formed in each of outer peripheral portions 104a and 105a of the two guide disks 104 and 105 at equal intervals such that the positions of the notched portions 111 of one disk coincide with those of the other disk. The works W loaded by the rotating rod 95 are respectively engaged with the notched portions 111 to be guided sideways from the line conveyor 79.

A load guide member 113 is mounted between the first rotating guide member 103 and the support plate 91.

As shown in FIG. 4, the load guide member 113 is constituted by upper and lower guide plates 114 and 115 respectively located at substantially the same heights as those at which the two guide disks 104 and 105 are located. Resin protective members 116 (see FIG. 4) are attached to arcuated edge portions formed along the outer peripheries of the guide disks 104 and 105.

The first rotating guide member 103 and the load guide member 113 constitute a load guide mechanism of the weigher apparatus 80.

Figure 5:
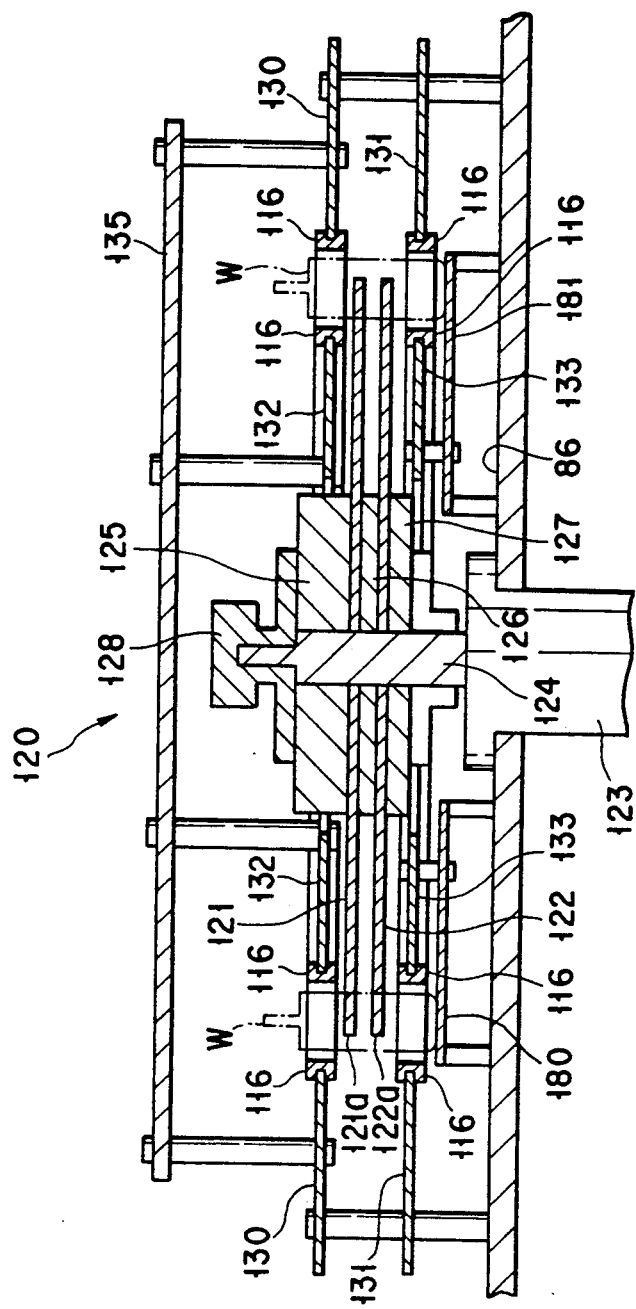
FIG. 5 is an enlarged sectional view taken along a line 5—5 in FIG. 1A.

The rotating carrier 120 is arranged at a central portion of the base plate 86. As shown in FIG. 5, similar to the rotating guide member 103, the rotating carrier 120 has two convey disks 121 and 122. The convey disks 121 and 122 are fitted on a rotating shaft 124 extending from a bearing 123 and are clamped/fixed by a clamping member 128 such that they are sandwiched between spacers 125, 126, and 127.

Note that the upper convey disk 121 is mounted at a position slightly lower than that of the upper guide disk 104 of the first rotating guide member 103, whereas the lower convey disk 122 is mounted at a position slightly higher than that of the lower guide disk 105.

Ten circular notched portions 129, each having a diameter larger than that of the work W, are formed in each of outer peripheral portions 121a and 122a of the convey disks 121 and 122 such that the positions of the notched portions 129 of one disk coincide with those of the other disk (see FIG. 1B). Works loaded by the notched portions 111 of the first rotating guide member 103 are received by the notched portions 129 one by one to be conveyed to a convey portion 138 of the weighing conveyor 137 (to be described later).

Outer upper and lower guide plates 130 and 131 are respectively arranged around the rotating carrier 120 at the same heights as those at which the upper and lower guide plates 114 and 115 of the load guide member 113 are located.

The above-mentioned protective members 116 are attached to the inner edges of the outer upper and lower guide plates 130 and 131 to guide works engaged with the notched portions 129 so as to prevent the works from escaping outside (see FIG. 1B).

An inner upper guide plate 132 having an outer diameter smaller than that of the convey disk 121 is arranged above the upper convey disk 121, whereas an inner lower guide plate 133 having the same shape as that of the inner upper guide plate 132 is arranged below the lower convey disk 122.

The inner upper and lower guide plates 132 and 133 are supported at the same heights as those at which the outer upper and lower guide plates 130 and 131 are located. Protective members 116 are respectively attached to the outer edges of the guide plates 132 and 133. The inner guide plates 132 and 133 serve to guide the works W in the notched portions 129 so as to prevent them from moving deep into the notched portions 129 except at positions opposite to the weighing conveyor 137 (see FIG. 1B).

A support plate 135 having both ends supported by the outer upper guide plate 130 is arranged above the inner upper guide plate 132. The inner upper guide plate 132 is supported by this support plate 135 from above.

Figure 6:
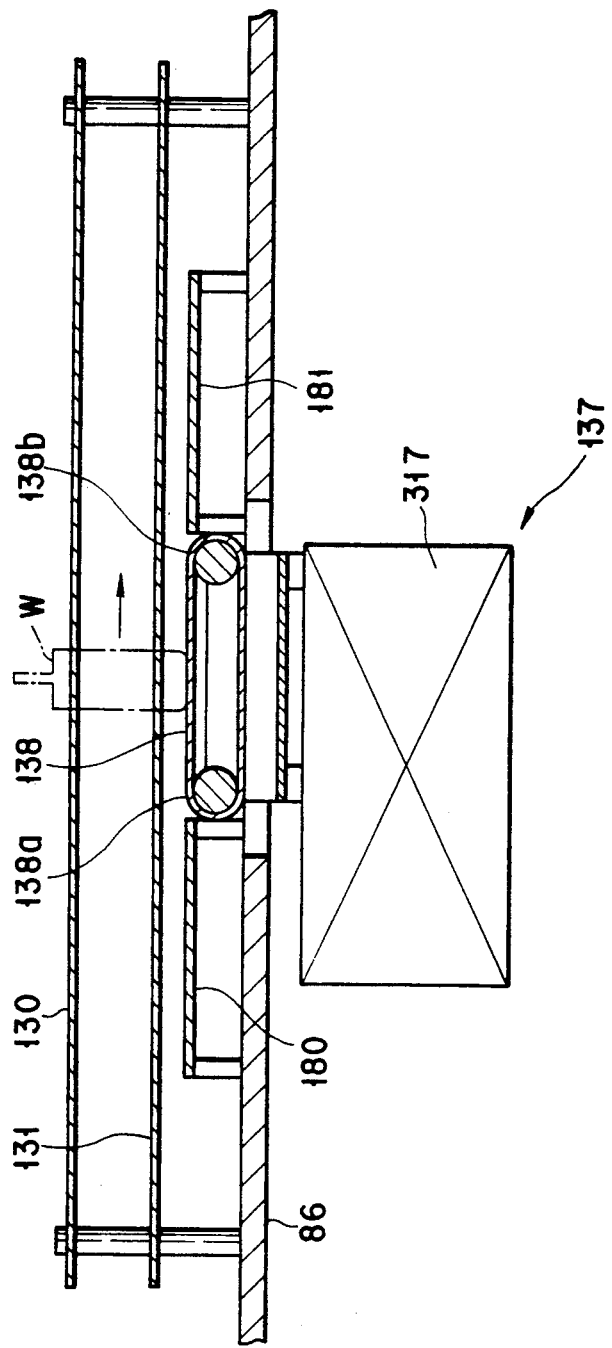
FIG. 6 is an enlarged sectional view taken along a line 6—6 in FIG. 1A.

As shown in FIG. 6, the weighing conveyor 137 has the convey portion 138 located above the base plate 86 and is designed to weigh a work loaded on one end 138a of the convey portion 138 while the work is conveyed from one end 138a to the other end 138b.

Note that the outer upper and lower guide plates 130 and 131 respectively include straight portions 130a and 131a (see FIG. 8A) for guiding a work, loaded onto one end 138a of the convey portion 138 of the weighing conveyor 137, slightly deeper into the notched portion 129. The inner upper and lower guide plates 132 and 133 respectively include stepped portions 132a and 133a (see FIG. 8A) so as not to come into contact with the work guided into the notched portion 129.

The moving speed of the convey portion 138a of the weighing conveyor 137 is set to be slightly higher than that of the notched portion 129 so as to convey the work W, loaded on one end 138a of the convey portion 138, to the other end 138b without letting it come into contact with the inner edge of the notched portion 129.

The weighed work W conveyed to the other end of the convey portion 138 is conveyed toward the second rotating guide member 140 along the guide plates 130 to 133.

As shown in FIG. 4, the second rotating guide member 140 has the same arrangement as that of the first rotating guide member 103, and hence includes two guide disks 141 and 142.

The two guide disks 141 and 142 are fitted on a rotating shaft 144 extending from a bearing 143 through spacers 145 and 146 and is clamped/fixed by a clamping member 147 from above.

J-shaped notched portions 148 are formed in outer peripheral portions 141a and 142a of the guide disks 141 and 142, and an unload guide member 150 is arranged outside the guide disks 141 and 142. The unload guide member 150 is constituted by upper and lower guide plates 151 and 152, each having one end portion continuous with a corresponding one of the inner upper and lower guide plates 132 and 133.

The other end portion of each of the upper and lower guide plates 151 and 152 extends straight to the support plate 92 along the front surface portion 87a of the frame plate 87 (FIGS. 1A and 1B).

First and second gate units 155 and 160 are arranged between the second rotating guide member 140 and the right side surface 87c of the frame plate 87 to guide defective works in accordance with weighing results obtained by the weighing conveyor 137.

The first gate unit 155 drives an internal air cylinder (not shown) to pivot a gate 156 counterclockwise so as to convey a defective work toward the rotating carrier 120 while keeping the defective work engaged with the notched portion 148.

The second gate unit 160 drives an internal air cylinder (not shown) to pivot a gate 161 counterclockwise so as to guide a defective work having an excessive weight to an inclined plate 162 inclined downward. The second gate unit 160 guides a defective work having an insufficient weight to an inclined plate 163 without pivoting the gate 161.

Work discharge holes 164 and 165 are respectively formed on the distal end sides of the inclined plates 162 and 163.

These work discharge holes 164 and 165 respectively communicate with the discharge chutes 170 and 171 attached to side surfaces of the driving housing 85 and the base 81.

Note that the rotating shafts 107, 124, and 144 of the first rotating guide member 103, the rotating carrier 120, and the second rotating guide member 140 are directly coupled to pulleys 173, 174, and 175, respectively, in the driving housing 85.

Figure 7:
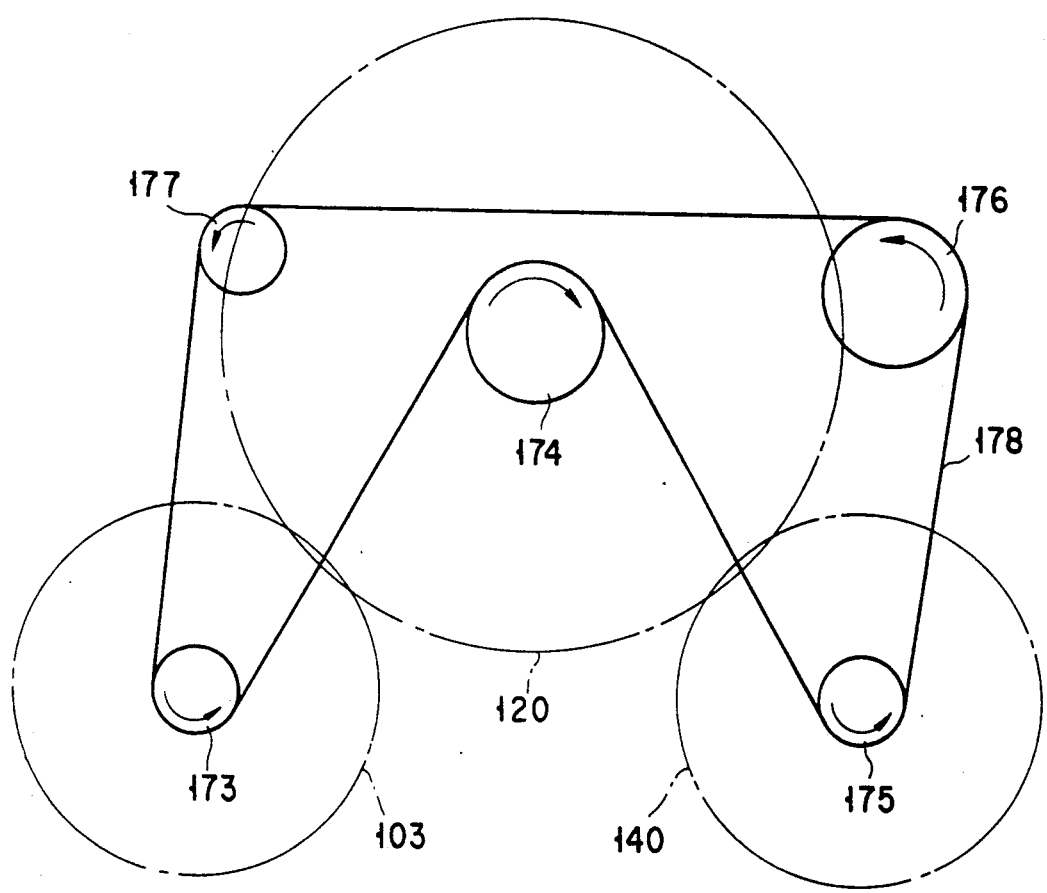
FIG. 7 is a schematic view showing a driving mechanism in the first embodiment.

A timing belt 178 is looped around the respective pulleys 173 to 175 through a driving pulley 176 coupled to a motor (not shown) and a relay pulley 177, as shown in FIG. 7.

The ratios between the pulleys 173 to 175 are set in advance to be 6:10:6 so that the notched portions of the respective rotating members are synchronized with each other. Note that the rotating rod 95 is coupled to be rotated six times per rotation of the pulleys 173 and 175.

Bottom plates 180 and 181 constituting the work convey surfaces of the weigher apparatus 80 are mounted on the base plate 86 at lower positions between the first rotating guide member 103 and the rotating carrier 120, and between the rotating carrier 120 and the second rotating guide member 140.

On end 180a of the bottom plate 180 on the load side is located near the line conveyor 79 and is set at a height slightly lower than the height at which a convey surface 79a of the line conveyor 79 is located. The other end 180b of the bottom plate 180 is located near one end of the convey portion of the weighing conveyor 137 and is set at substantially the same height as that at which the convey portion 138 is located.

One end 181a of the bottom plate 181 on the unload side is also located near the line conveyor 79 and is set at a position slightly higher than the position at which the convey surface 79a of the line conveyor 79 is located. The other end 181b of the bottom plate 181 is set at substantially the same height as that at which the convey portion of the weighing conveyor 137 is located.

In addition, a bottom plate 182 constituting a convey surface for defective works is mounted at a lower right position of the second rotating guide member 140 (see FIG. 4).

Note that an operation housing 185 is formed upright on the rear upper surface of the base 81. An operation panel 186 is arranged on the housing 185.

Figure 9A:
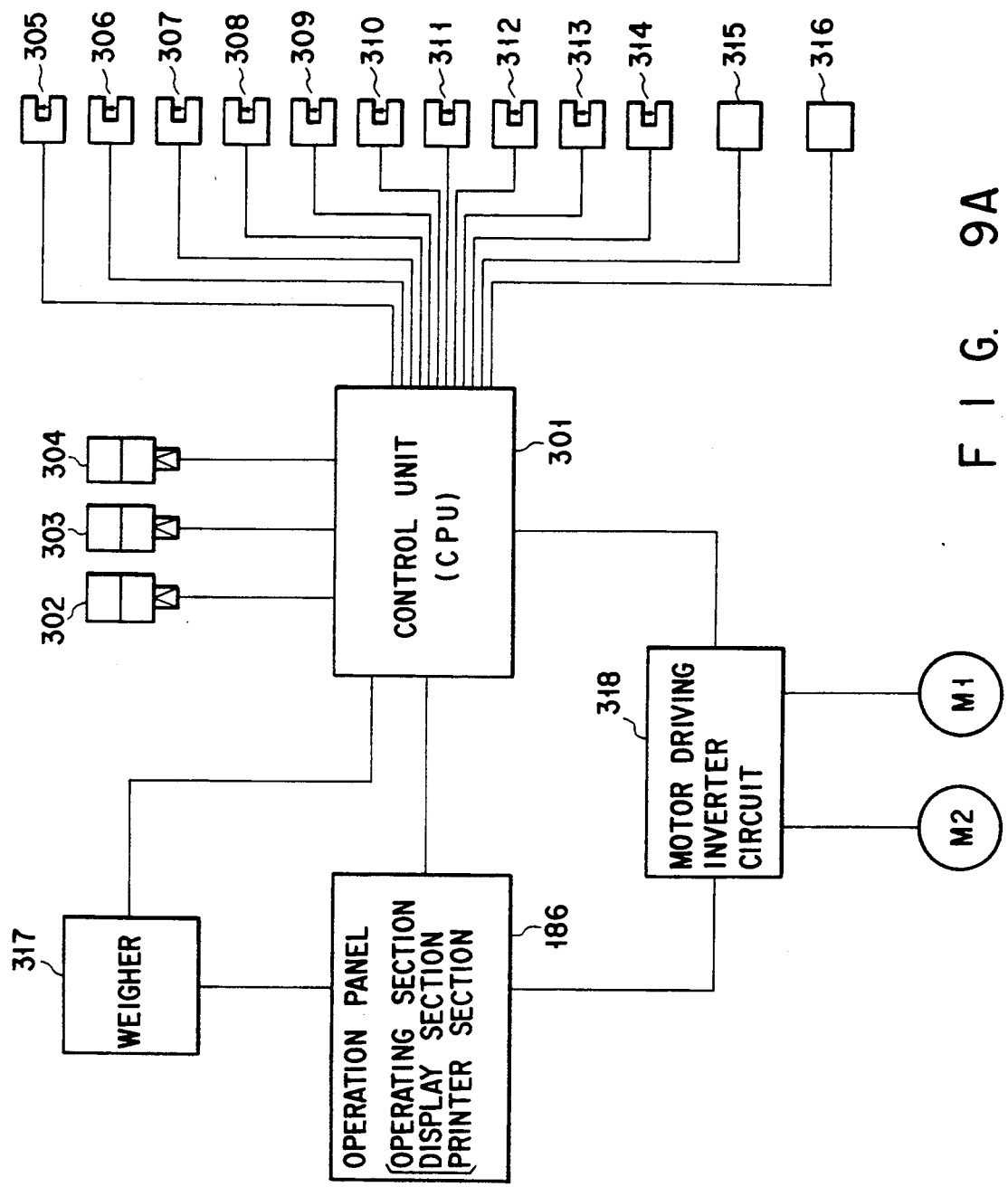
FIG. 9A is a schematic block diagram showing a control circuit in the first embodiment.

FIG. 9A shows the control circuit of the weigher apparatus having the above-described arrangement.

A work entrance gate 302 and work selection gates 303 and 304, each constituted by a solenoid-type gate, are connected to a control unit 301 constituted by a CPU and the like. In addition, the following photointerrupter type sensors are connected to the control unit 301: a sensor 305 for detecting a work load state at the scroll (rotating rod) portion; sensors 306 and 307 for detecting a full state of works in the next step; a sensor 308 for detecting a full state of defective (NG) works; sensors 309 and 310 for detecting a work convey (indexing) timing; a sensor 311 for detecting a work at the entrance; a sensor 312 for detecting a work to be measured; and sensors 313 and 314 for detecting a work to be selected/confirmed.

In addition, a sensor 315 for detecting whether a convey portion cover is opened or closed, and a sensor 316 for detecting an air pressure are connected to the control unit 301.

Furthermore, the following components are connected to the control unit 301: a weigher 317 of the weighing conveyer 137; the operation panel 186 including an operating section, a display section, and a printer section; and a motor driving inverter circuit 318. A work conveying motor M1 and a motor M2 are connected to the motor driving inverter circuit 318. The motor M1 drives the above-mentioned driving pulley 176 and a driving mechanism (not shown) coupled to the rotating rod 95 through the belt 97. The motor M2 drives the convey portion 138 of the weighing conveyor 137.

Note that the gates 302 to 304 and the sensors 305 to 314 are arranged at predetermined positions along the work convey path.

Figure 9B:
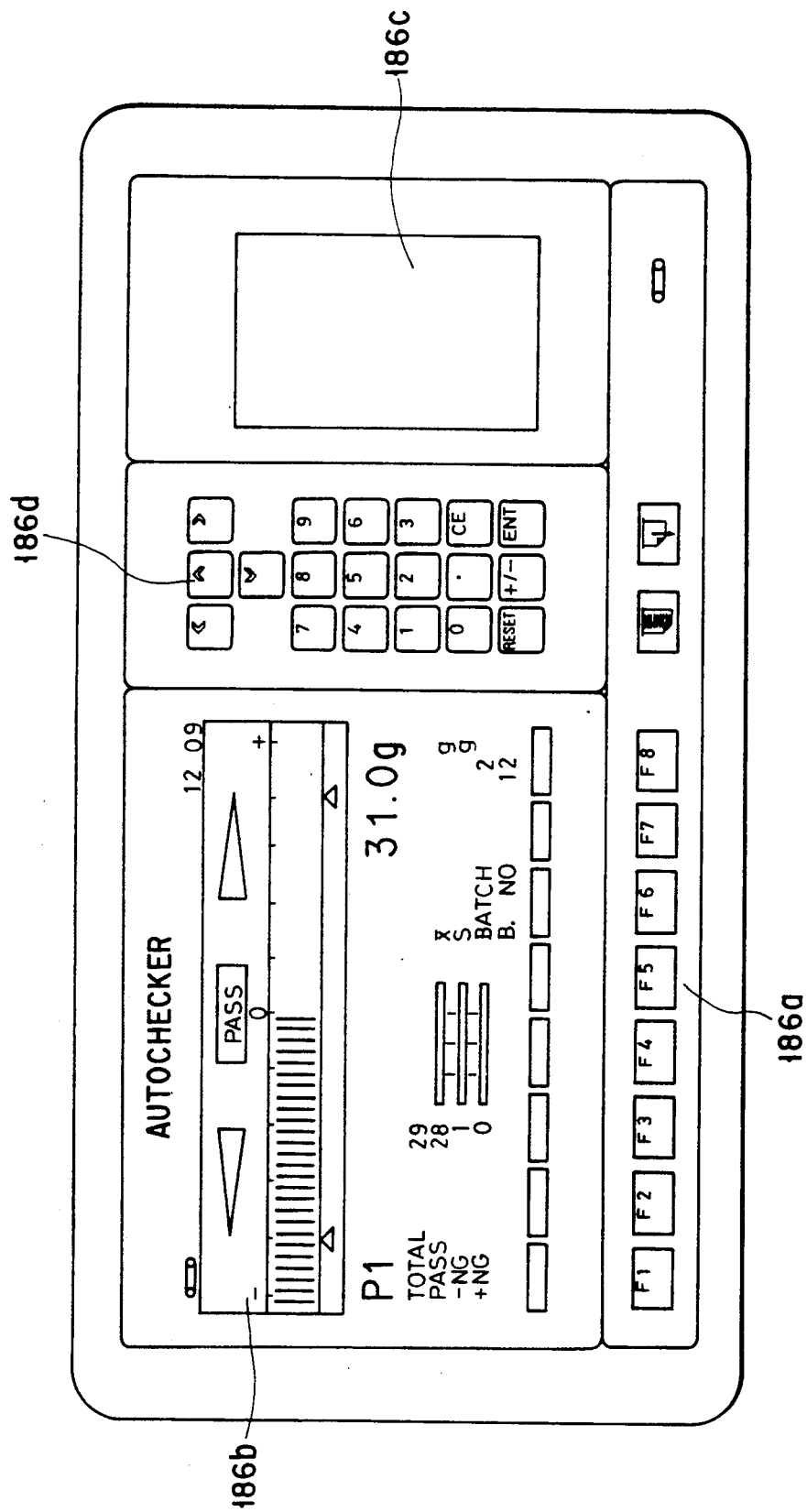
FIG. 9B is a view showing an operation panel in the first embodiment in detail.

FIG. 9B shows the operation panel 186 in detail, which is constituted by an operating section 186a for inputting various numerical values, a display section 186b for graphically displaying weighing results in various forms, and a printer section 186c for printing out weighing results in various forms.

An operation of the weigher apparatus 80 will be described next.

Assume that the motors M1 and M2 have already been driven.

The works W which are conveyed on the line conveyor 79 sequentially enter from the left side surface 87b of the frame plate 87 and are guided toward one end of the rotating rod 95 by the guide plates 93 and 94. Since the rotating rod 95 is being rotated at this time, the works W are conveyed toward the first rotating guide member 103 by the spiral groove 96 of the rotating rod 95 while their intervals are increased. The works W engaged with the notched portions 111 of the guide disks 104 and 105 of the first rotating guide member 103 are guided by the load guide member 113 to be moved from the line conveyor 79 onto the bottom plate 180, and are conveyed toward the rotating carrier 120 which is being rotated at this time. Each work W which is conveyed along this guide path is received by a corresponding one of the notched portions 129 at a position where the guide path is in contact with the convey path of the rotating carrier 120.

Figure 8A:
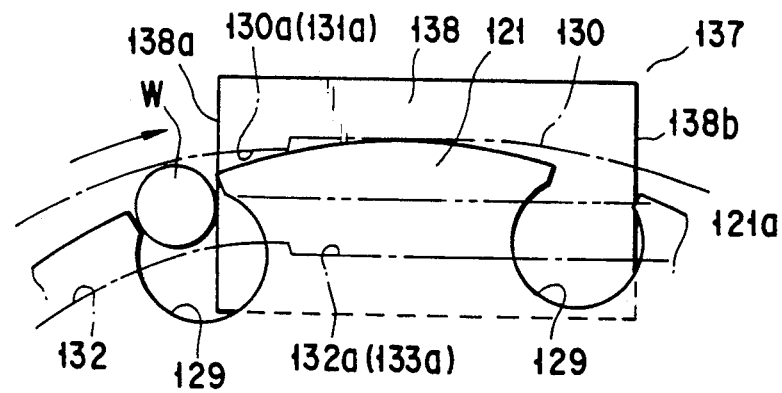
FIGS. 8A to 8C are schematic views, each showing a main portion of the first embodiment and used to explain its operation.
Figure 8B:
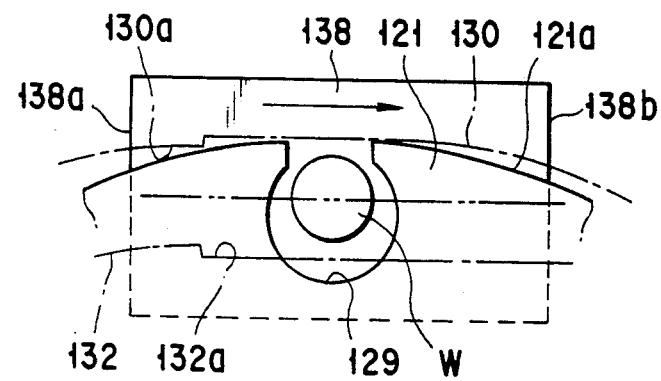

As shown in FIG. 8A, the work W received by the notched portion 129 of the rotating carrier 120 which is being rotated is guided by the respective guide plates 130 to 133 to be conveyed to one end 138a of the convey portion 138 of the weighing conveyor 137, and is guided slightly deeper into (almost the center of) the notched portion 129 by the straight portions 130a and 131a of the outer guide plates 130 and 131. With this operation, as shown in FIG. 8B, the work W loaded on one end 138a of the convey portion 138, which is in a convey mode, is conveyed by the convey portion 138, which is moved at a speed higher than the moving speed of the notched portion 129, while the work W is separated from the inner edge of the notched portion 129. The work W is then weighed by the weigher 317.

Figure 8C:
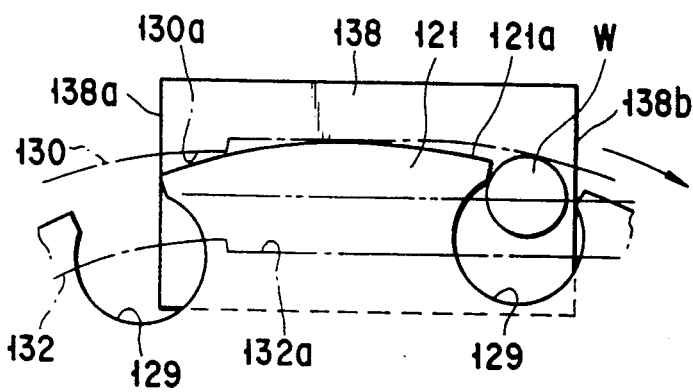

The work W which is weighed and conveyed to the other end 138b of the convey portion 138 is discharged from the convey portion 138 while it is in contact with the notched portion 129, and is conveyed toward the second rotating guide member 140 which is being rotated, as shown in FIG. 8C. The work W which is conveyed along this convey path is engaged with the notched portion 148 at a position where the convey path is in contact with the convey path of the second rotating guide member 140.

The work W which is engaged with the notched portions 148 of the guide disks 141 and 142 of the second rotating guide member 140 which is being rotated is guided by the unload guide member 150 to be moved from the bottom plate 181 onto the line conveyor 79 again.

The acceptable work W returned onto the line conveyor 79 is released from the notched portions 148 and passes through a portion between the unload guide member 150 and the first gate unit 155 to be discharged to the right side of the frame plate 87.

If the work W is defective, the gate 156 of the first gate unit 155 pivots counterclockwise. Consequently, the work W is not released from the notched portions 148 but is conveyed toward the second gate unit 160. If the defective work W has an excessive weight, the gate 161 of the second gate unit 160 also pivots counterclockwise. As a result, the defective work W is conveyed to one discharge chute 170 through the inclined plate 162 to be stored in the defective work case 84.

In addition, the defective work W having an insufficient weight is conveyed to the other discharge chute 171 through the inclined plate 163 to be stored in the defective work case 83.

In the above-described manner, the works W loaded from the line conveyor 79 are consecutively weighed, while the defective works W are selectively stored in the defective work cases 83 and 84, and only the acceptable works W are discharged onto the line conveyor 79.

That is, in this embodiment, the work W on the line conveyor 79 is moved toward the first rotating guide member 103 while it is engaged with the spiral groove 96 of the rotating rod 95, and is engaged with the notched portion 111. The work W, which is guided toward the line conveyor 79 while it is engaged with the notched portion 111, is received by the notched portion 129 formed in the outer periphery of the rotating carrier 120. The work W received by the notched portion 129 is loaded onto the convey portion 138, of the weighing conveyor, which is moved at a speed slightly higher than the moving speed of the notched portion 129, and is weighed while it is separated from the inner edge of the notched portion 129. The weighed work W is received by the notched portions 148 of the second rotating guide member 140 to be discharged onto the line conveyor 79.

In the weigher apparatus 80 of the first embodiment, therefore, the works W guided from the line conveyor 79 by the notched portions 111, formed in the outer periphery of the first rotating guide member 103 at a predetermined pitch, through the rotating rod 95 having the spiral groove 96 are loaded/guided from the direction along the convey direction of the weighing conveyor 137 while they are sandwiched between the notched portions 129, formed in the outer periphery of the rotating carrier 120, and the guide plates 130 and 131. Therefore, the works W can be conveyed on the weighing conveyor 137 while falling and swaying of the works W are prevented. In addition, the weighed works W are returned to the line conveyor 79 by the second rotating guide member 140 from the direction along the convey direction of the line conveyor 79. With this operation, the weigher apparatus 80 of this embodiment can accurately weigh works in standing posture on the line conveyor 79 at high speed.

Figure 11:
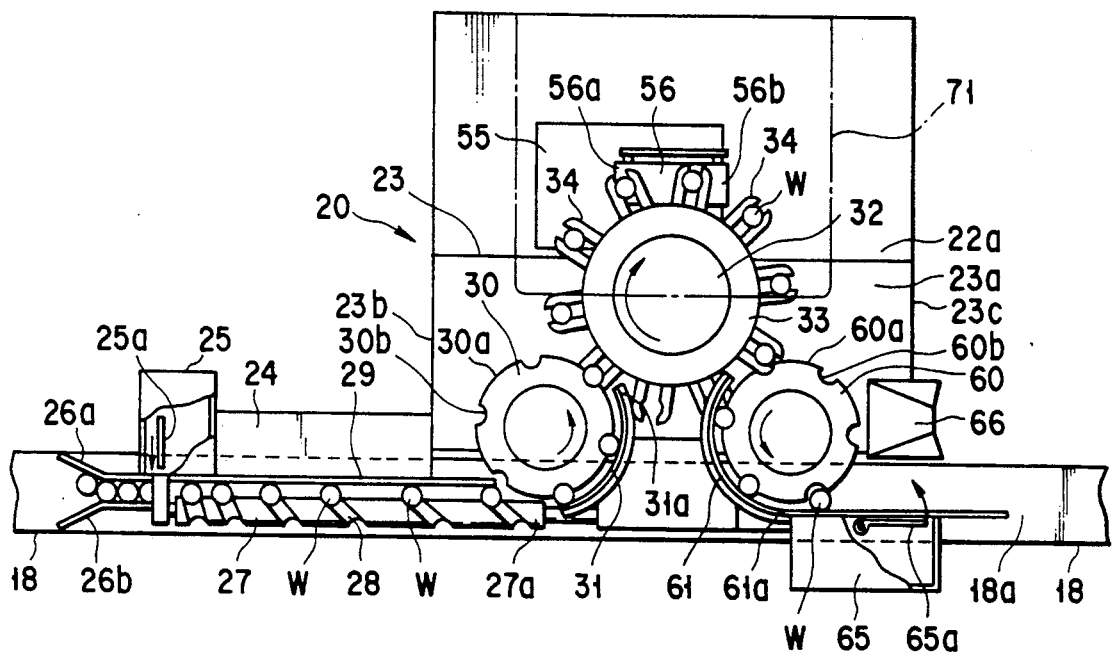
FIG. 11 is a plan view of the second embodiment.
Figure 12:
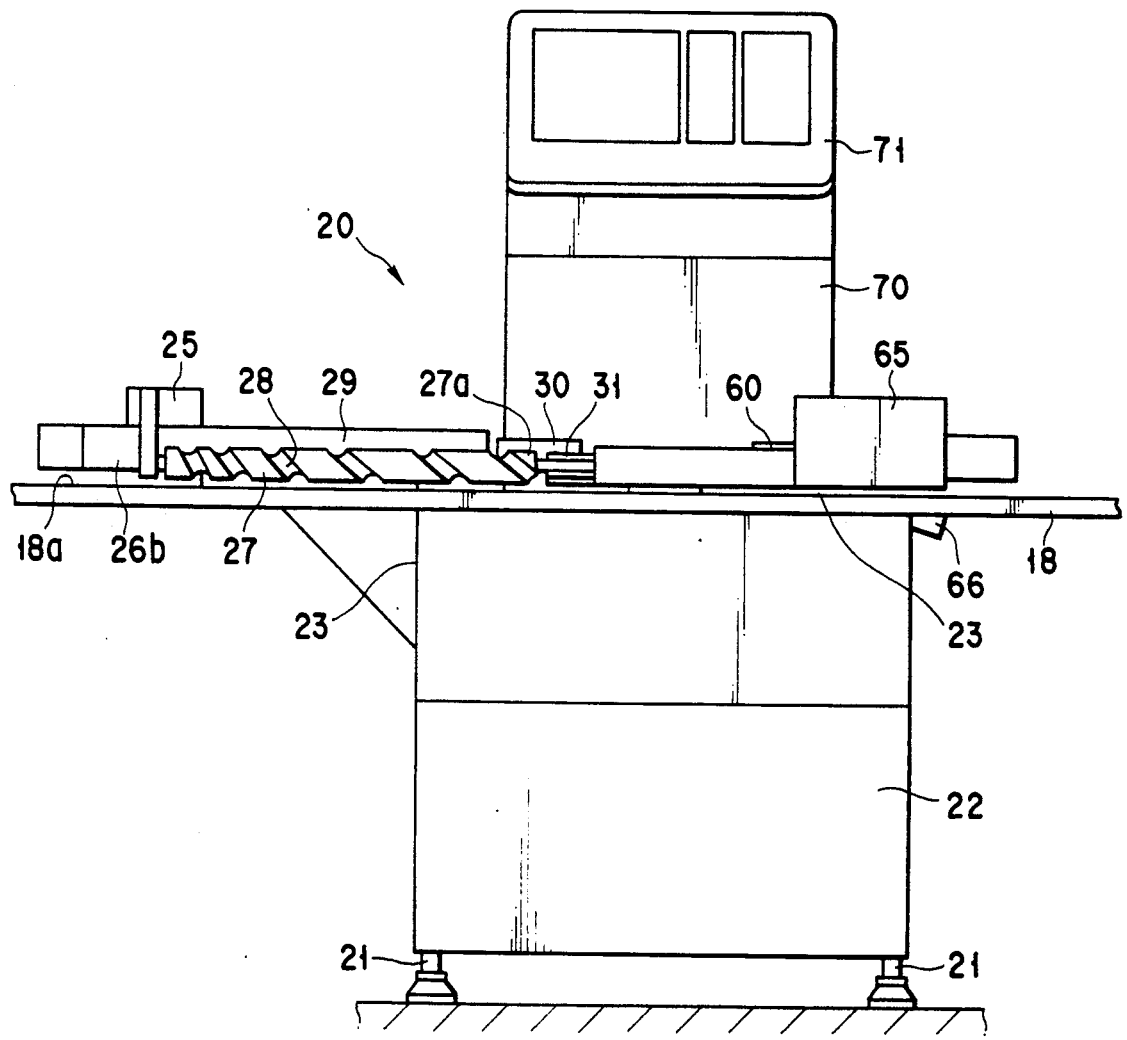
FIG. 12 is a front view of the second embodiment.

The second embodiment of the present invention will be described below with reference to FIGS. 11 to 18C. FIG. 11 is a plan view showing a weigher apparatus 20 according to the second embodiment. FIG. 12 is a front view of the apparatus. FIG. 13 is a side view of the apparatus.

As indicated by the side view in FIG. 13, this weigher apparatus 20 is arranged near a side portion of a line conveyor 18 having a straight convey path, and is designed to weigh a cylindrical work W (e.g., an aerosol can), which is conveyed on the line conveyor 18, upon moving it sideways from the line conveyor 18, and return the weighed work onto the line conveyor 18.

Referring to these drawings, a base 22 of the weigher apparatus 20 is supported by legs 21 at four corners, and a substantially rectangular parallelepiped driving housing 23 is fixed on an upper surface portion 22a of the base 22 to be adjacent to the line conveyor 18.

An upper surface 23a of the driving housing 23 is set at the same height as that at which a convey surface 18a of the line conveyor 18 is located. A support member 24 extending in a direction along the line conveyor 18 is attached to a left side surface 23b of the driving housing 23. A gate mechanism 25 for regulating loading of the work W is mounted on the distal end of the support member 24. This gate mechanism 25 serves to regulate loading of the work W by causing an internal gate plate 25a to extend over the convey path by means of an air cylinder (not shown) or the like.

Guide plates 26a and 26b are mounted on the load side of the gate mechanism 25 to guide the work W, placed on the line conveyor 18, to the gate mechanism 25.

A rotating rod 27 and a straight guide plate 29 are arranged on the unload side of the gate mechanism 25 along the line conveyor 18 at a predetermined distance therefrom. A spiral groove 28 is formed in the surface of the rotating rod 27 such that the pitch of the groove 28 is increased in a direction to separate from the gate mechanism 25. The works W passing through the gate mechanism 25 are sandwiched between the spiral groove 28 and the straight guide plate 29 and conveyed toward the driving housing 23 while the intervals between the works W are gradually increased.

A first guide disk 30 is arranged on the side of a distal end 27a of the rotating rod 27. The first guide disk 30 is rotated counterclockwise (FIG. 11) by a driving means in the driving housing 23. Six semicircular notched portions 30b are formed in an outer peripheral portion 30a of the first guide disk 30 at equal intervals. A circular guide plate 31 having an arcuate shape is arranged around the notched portions 30b at a predetermined distance therefrom.

The first guide disk 30 and the circular guide plate 31 constitute the guiding/loading mechanism of the weigher apparatus 20. The works W which are conveyed on the line conveyor 18 while they are sandwiched between the rotating rod 27 and the straight guide plate 29 are sandwiched between the notched portions 30b of the first guide disk 30 and the circular guide plate 31 to be loaded onto the driving housing 23. Note that the rotational speed of the rotating rod 27 is set beforehand to be 1/6 that of the first guide disk 30 to consecutively convey the works W, one by one, to the notched portions 30b of the first guide disk 30.

A rotating arm member 32 constituting the rotating carrier of the second embodiment is arranged behind the first guide disk 30.

The rotating arm member 32 is constituted by a rotating disk 33 which is rotated clockwise by a driving means in the driving housing 23, and 10 pairs of clamping arms 34 radially extending from the outer periphery of the disk 33.

Figure 14:
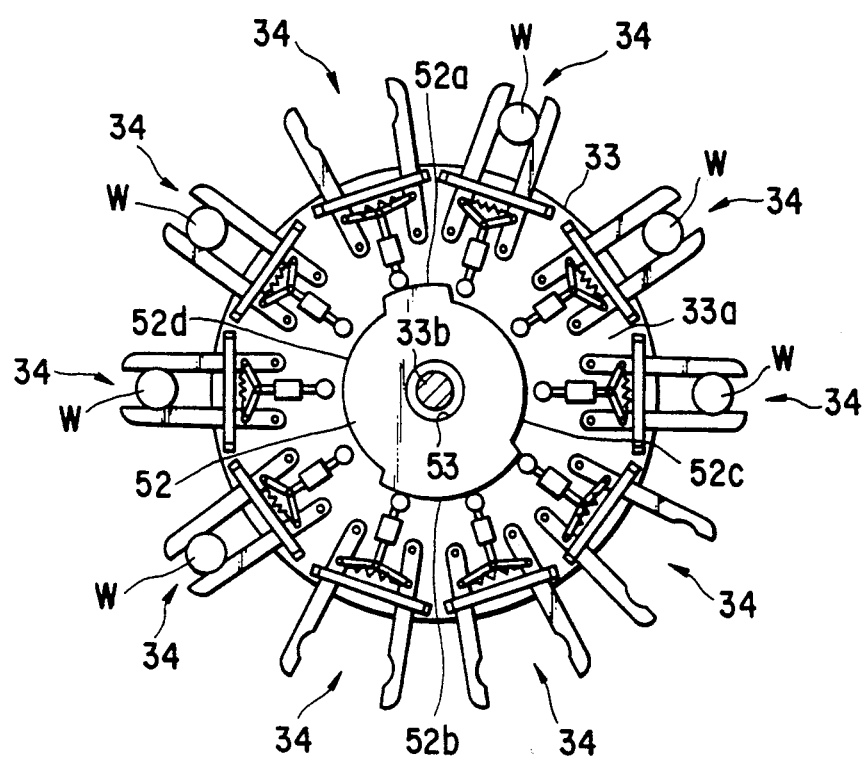
FIG. 14 is a view showing a main part of the second embodiment, viewed from its rear surface side.

FIG. 14 is a schematic view showing the rotating arm member 32 viewed from the driving housing 23 side. FIG. 15 is an enlarged view of one pair of clamping arms 34.

As shown in FIG. 15, arcuated clamping portions 37 and 38 for clamping the work W are respectively formed on one end 35a and one end 36a of a pair of arms 35 and 36 to oppose each other. The other end 35b and the other end 36b of the arms 35 and 36 are attached to a lower surface 33a of the rotating disk 33 through pivotal pins 39 and 40. With this arrangement, the arms 35 and 36 pivot on the pivotal pins 39 and 40.

Shafts 41 and 42 are fixed at substantially the middle portions of the arms 35 and 36. A spring 43 is connected between the shafts 41 and 42 to bias the arms 35 and 36 in a direction to close them.

The shafts 41 and 42 are pivotally locked to one end 44a and one end 45a of link rods 44 and 45, respectively. Both the other end 44b and the other end 45b of the link rods 44 and 45 are pivotally locked to one end 46a of a slide rod 46 arranged between the arms 35 and 36.

A shaft 47 extends upright on the other end 46b of the slide rod 46 in a direction perpendicular to the longitudinal direction of the slide rod 46. A roller 48 is locked to the shaft 47. In addition, the movement of the slide rod 46 in its longitudinal direction is regulated by a guide member 49 fixed to the rotating disk 33.

With this arrangement, when the slide rod 46 is pushed from the roller 48 side toward the outer periphery of the rotating disk 33, the angle defined by the link rods 44 and 45 is increased against the biasing force of the spring 43, and the two arms 35 and 36 are opened.

Note that a stopper 50 of the slide rod 46 is brought into contact with one end portion 49a of the guide member 49 to stop the slide rod 46 at a position where the distance between the clamping portions 3 and 38 becomes smaller than the outer diameter of a work while the arms 35 and 36 are closed. In addition, the length of the guide member 49 is set in advance such that even if the roller 48 is pushed to a position where it is brought into contact with the other end portion 49b of the guide member 49, the angle defined between the link rods 44 and 45 is regulated to an angle smaller than 180°.

Furthermore, the arms 35 and 36 are supported, from the lower surface side, by a support plate 51 having two ends fixed to the rotating disk 33. With this support by the support plate 51, the distal end portions of the arms 35 and 36 including the clamping portions 37 and 38 are horizontally opened/closed without downward shift.

A cam plate 52 is arranged inside the clamping arms 34, each having the above-described arrangement, to be concentrical with the rotating disk 33, as shown in FIG. 14. The cam plate 52 is supported on the driving housing 23 in such a manner that the outer peripheral portion of the cam plate 52 is set at a height at which it comes into contact with the side surface of the roller 48.

First and second large-diameter portions 52a and 52b of the cam plate 52 have diameters (diameters with reference to a rotating shaft 33b of the rotating disk 33 as the center) large enough to push the roller 48 of each clamping arm 34 so as to open the arms 35 and 36 widely. The first large-diameter portion 52a is set within an angle range in which the clamping portions of the clamping arm 34 are rotated/moved from the load position of a weighing conveyor 55 to its unload position. In addition, the second large-diameter portion 52b is set within an angle range in which the clamping portions of the clamping arm 34 are rotated/moved from a position where they cross the outer peripheral portion of a second guide disk 60 (to be described later) in contact, to a position where they cross the outer peripheral portion of the first guide disk 30 in contact.

The diameters of first and second small-diameter portions 52c and 52d formed between the first and second large-diameter portions 52a and 52b are set so as not to be brought into contact with the roller 48 of the clamping arm 34. Note that the rotating shaft 33b of the rotating disk 33 extends from a hole 53 formed in the center of the cam plate 52 into the driving housing 23.

The rotating arm member 32 having the above-described arrangement is rotated in synchronism with the first guide disk 30 at a rotational speed 6/10 that of the first guide disk 30 to consecutively clamp works, one by one, which are guided by the notched portions 30b of the first guide disk 30.

The weighing conveyor 55 is fixed on the base behind the driving housing 23. The weighing conveyor 55 has a straight convey path which is in contact with the track of rotation of the clamping arms of the rotating arm member 32.

The weighing conveyor 55 conveys a work, loaded onto one end 56a of a convey portion 56, to the other end 56b at the same moving speed as that of the clamping arm 34.

The work W conveyed to the other end 56b of the convey portion 56 of the weighing conveyor 55 is clamped by the clamping arm 34 again and is rotated/moved toward the line conveyor 18.

The second guide disk 60 and a disk guide plate 61 constituting a guiding/discharging mechanism of the present invention are arranged between the rotating arm member 32 and the line conveyor 18. Similar to the first guide disk 30, the second guide disk 60 is rotated counterclockwise (in FIG. 11) by a driving means in the driving housing 23, and six semicircular notched portions 60b are formed in an outer peripheral portion 60a, which is in contact with the track of rotation of the clamping arms and the convey direction of the line conveyor 18, at equal intervals.

In order to receive works from the clamping arms 34 one by one through the notched portions 60b, the second guide disk 60 is rotated in synchronism with the first guide disk 30 at the same rotational speed as that thereof in such a manner that the center of each of the notched portions 60b coincides with that of the clamping portions of a corresponding one of the clamping arms 34 on a line connecting the rotational center of the second guide disk 60 to the center of the rotational arm member 32.

The work conveyed from one end 61a of the circular guide plate 61 toward the convey direction of the line conveyor 18 is separated from the notched portion 60b of the second guide disk 60 and is unloaded onto the line conveyor 18.

A removal gate mechanism 65 and a discharge chute 66 are arranged on both the sides of the unload portion of the line conveyor 18. The removal gate mechanism 65 serves to remove defective works. The discharge chute 66 serves to discharge the defective works W, pushed toward the driving housing 23 by a removal gate 65a, in the direction of a right side surface 23c of the driving housing 23.

An operation housing 70 is formed upright behind the weighing conveyor 55. An operation panel 71 is arranged on the operation housing 70. The operation panel 71 serves to perform speed control of the first and second guide disks 30 and 60, the rotating arm member 32, and the weighing conveyor 55, perform selection/determination on the basis of weighing signals from the weighing conveyor 55, display the selection/determination results, and perform driving control of the removal gate mechanism 65. The overall control circuit of the weigher apparatus 2 including the operation panel 71 and the arrangement of each driving system are similar to those in the first embodiment, and hence a description thereof will be omitted.

An operation of the weigher apparatus 20 will be described next.

A work which is conveyed on the line conveyor 18 is guided to the gate mechanism 25 by the guide plates 26a and 26b. The work W which has passed through the gate mechanism 25 is sandwiched between the spiral groove 28 of the rotating rod 27, which is being rotated, and the straight guide plate 29 and is conveyed toward the first guide disk 30 which is being rotated.

The work W engaged with the notched portion 30b of the first guide disk 30 is guided by the circular guide plate 31 to be moved toward the rotating arm member 32 which is being rotated.

Figure 16A:
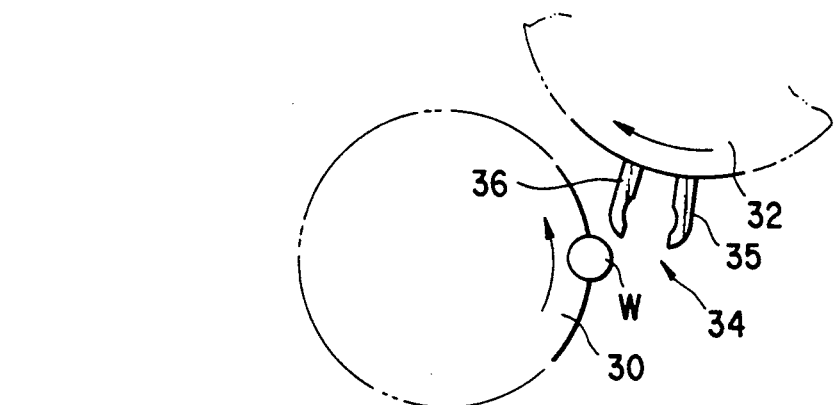
FIGS. 16A to 16C are schematic views for explaining an operation of the second embodiment.
Figure 16B:
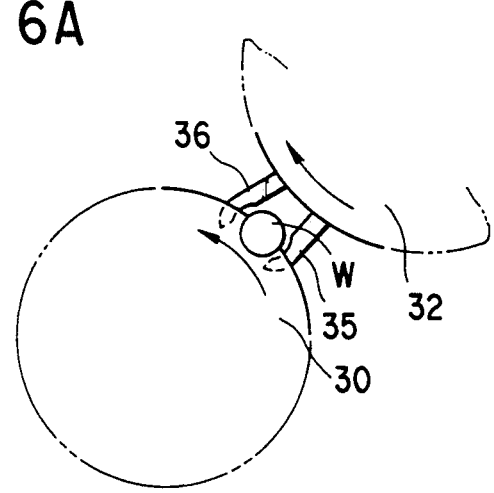

The clamping arm 34 of the rotating arm member 32 approaches the work W guided by the notched portion 30b of the first guide disk 30, which is being rotated, while the clamping arm 34 is open, as shown in FIG. 16A. When the work W is moved onto the line connecting the rotational center of the first guide disk 3 to that of the rotating arm member 32, as shown in FIG. 16B, the center of the clamping arm 34 also reaches this line, and the cam plate 52 is switched to the first small-diameter portion 52c at this position. As a result, the arms 35 and 36 are closed, and the work W is clamped between the clamping portions 37 and 38.

Figure 16C:
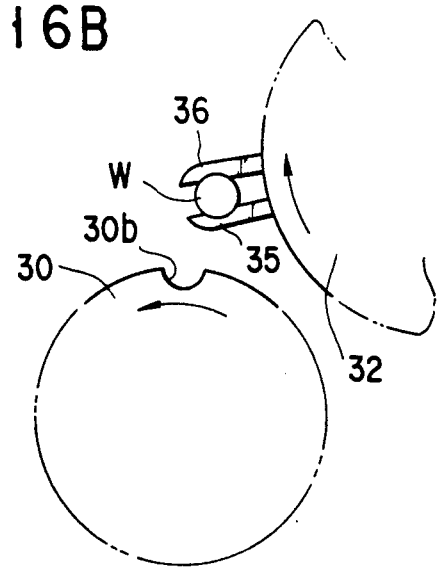

In addition, since the guiding effect of the circular guide plate 31 disappears from this position, the work W clamped by the clamping arm 34 is translated toward the weighing conveyor 55 along the track of rotation of the rotating arm member 32 while it is clamped by the clamping arm 34, as shown in FIG. 16C.

Figure 17A:
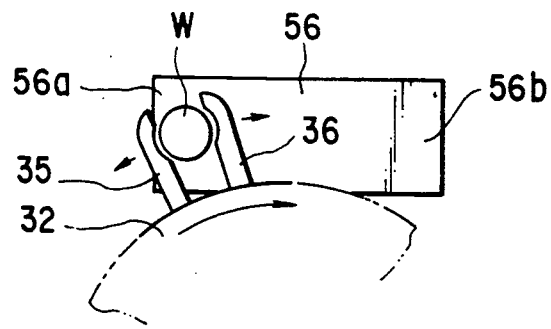
FIGS. 17A to 17C are schematic views for explaining an operation of the second embodiment.

The work clamped by the clamping arm 34 is released on one end 56a side of the convey portion of the weighing conveyor 55 in a convey state upon switching of the diameter of the cam plate 52, as shown in FIG. 17A.

Figure 17B:
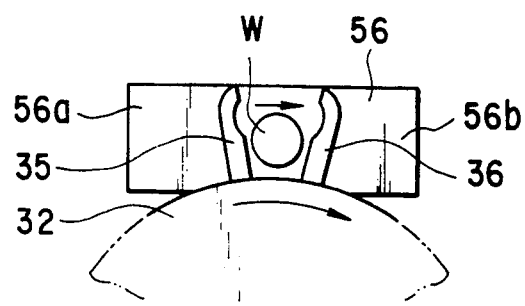

Since the convey speed of the conveying conveyor 55 is equal to the moving speed of the clamping arm 34, and the convey portion 56 is set at substantially the same height as that at which the convey surface 18a of the line conveyor 18 is located, the work is loaded onto the weighing conveyor 55 with a very small amount of swaying and the like, and weighing is completed in a very short convey time. In addition, since the clamping arm 34 is moved in an open state without contact with the work during this weighing/conveying operation, as shown in FIG. 17B, the clamping arm 34 has no influence on the weighing operation.

Figure 17C:
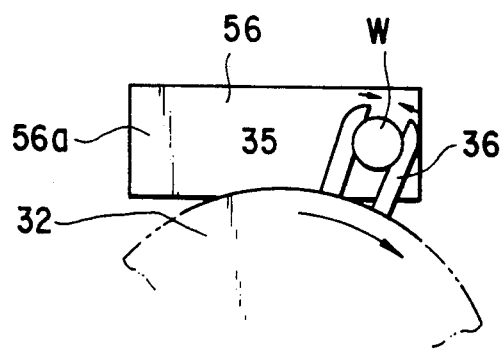

As shown in FIG. 17C, the work which has been weighed on the weighing conveyor 55 is clamped by the clamping arm 34 again, and is discharged from the weighing conveyor 55.

Figure 18A:
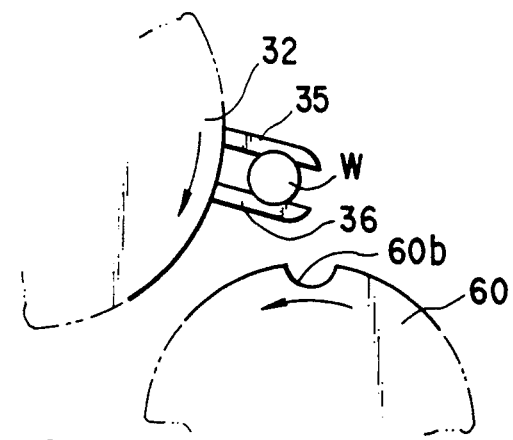
FIGS. 18A to 18C are schematic views for explaining an operation of the second embodiment.
Figure 18B:
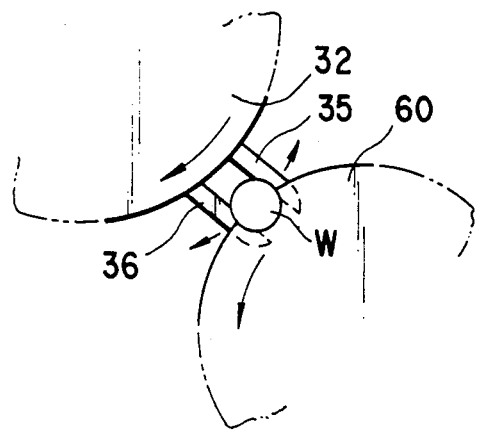
Figure 18C:
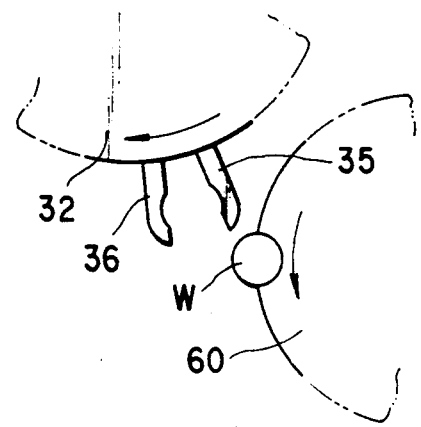
Figure 19:
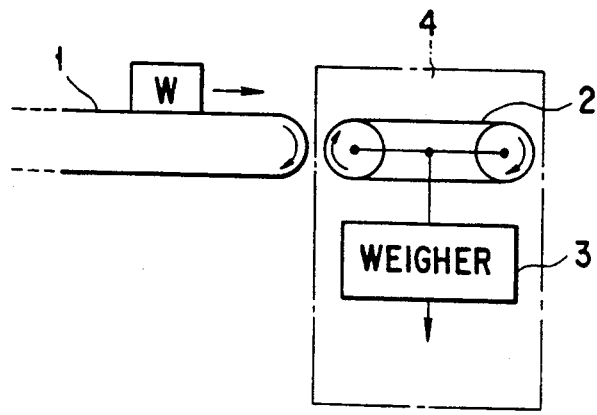
FIG. 19 is a schematic side view showing the arrangement of a conventional weigher apparatus.
Figure 20:
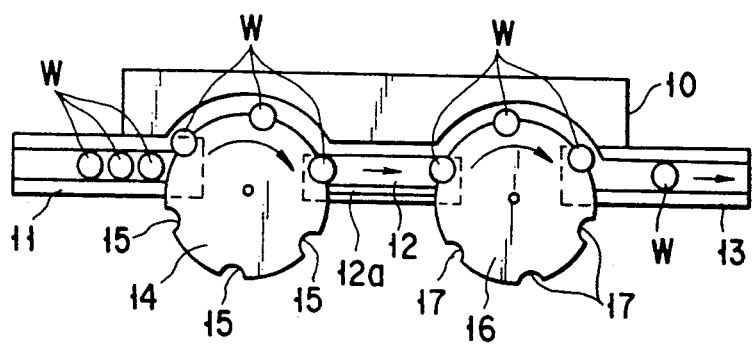
FIG. 20 is a plan view showing the arrangement of another conventional apparatus.

The weighed work clamped by the clamping arm 34 is moved close to the second guide disk 60 which is being rotated, as shown in FIG. 18A, and is engaged with the notched portion 60b, as shown in FIG. 18B. At this time, the clamping arm 34 is opened upon switching of the diameter of the cam plate 52 to release the work W. The work W engaged with the notched portion 60b is guided/discharged toward the line conveyor 18 while it is sandwiched between the notched portion 60b and the circular guide plate 61, as shown in FIG. 18C.

The work W, which is unloaded onto the line conveyor 18 and is released from the notched portion 60b of the second guide disk 60, passes through a side portion of the removal gate mechanism 65. If the work W passing through the side portion is defective, the work W is pushed toward the discharge chute 66 by the removal gate 65a. If the work W is nondefective, it is conveyed on the line conveyor 18.

That is, in this embodiment, the work W on the line conveyor 18 is moved toward the first guide disk 30 while it is engaged with the groove 28 of the rotating rod 27, and is engaged with the notched portion 30b of the first guide disk 30. The work W, which is guided sideways from the line conveyor 18 while it is engaged with the notched portion 30b, is clamped by the clamping arm 34 of the rotating arm member 32. The clamping arm 34 releases the clamped work W at the convey portion 56 of the weighing conveyor 55, and clamps the work W upon completion of the weighing operation so as to move it to a position where it is engaged with the notched portion 60b of the second guide disk 60. The work W engaged with the notched portion 60b of the second guide disk 60 returns onto the line conveyor 18.

As described above, therefore, the weigher apparatus according to the second embodiment of the present invention is designed such that a work guided by the first guiding mechanism sideways from the conveyor is clamped by the clamping arm of the rotating arm member to be rotated/moved toward the weighing conveyor, the work is released at the load portion of the weighing conveyor to be weighed, the weighed work is clamped by the clamping arm again to be rotated/moved toward the second guiding mechanism, and the weighed work is returned to the conveyor again by the second guiding mechanism. In addition, since the loading direction of a work with respect to the weighing conveyor is made to coincide with the convey direction of the weighing conveyor, and the direction in which a work is discharged from the second guiding mechanism to the conveyor is made to coincide with the convey direction of the conveyor, loading of a work, which is not weighed yet, onto the weighing conveyor, and unloading of a weighed work with respect to the conveyor can be very smoothly performed without causing falling and swaying of the work, thereby performing a weighing operation with higher precision at higher speed than the conventional apparatus.

In the second embodiment, the apparatus includes the removal gate mechanism 65 for selection. However, such a selecting mechanism may be independently arranged. In addition, defective works may be removed from the weighing conveyor 55. In this case, a clamping operation of each clamping arm may be regulated on the basis of a weighing/selection result, or a mechanism for removing defective works may be arranged on the discharge side of the weighing conveyor so as to remove a defective work before the clamping arm 34 is closed.

In the second embodiment, the convey direction of the line conveyor 18 is parallel to that of the weighing conveyor 55. However, the present invention is not limited to this. As long as the convey direction of the weighing conveyor is set along the track of rotation of the clamping arms, the convey direction of the weighing conveyor need not be parallel to the convey direction of the line conveyor 18.

As described above, according to the weigher apparatus of the second embodiment, since the works W, which are guided from the line conveyor 18 by the notched portions 30b, formed in the outer peripheral portion 30a of the first guide disk 30, through the rotating rod 27 having the spiral groove 28, are clamped by the clamping arms 34 of the rotating arm member 32 and are loaded from a direction along the convey direction of the weighing conveyor 55, the works W can be conveyed on the weighing conveyor 55 while falling and swaying of the works W are minimized. In addition, since the weighed works W are returned from a direction along the convey direction of the line conveyor 18 by the second guide disk 60, the works W can be weighed/selected at high speed and with high precision.

In the second embodiment, as a rotating carrier, the rotating arm member 32 having the clamping arms 34 is used. However, as in the first embodiment, notched portions may be formed in the outer peripheral portion of the rotating carrier so that works can be conveyed to the weighing conveyor 55 by the notched portions.

That is, since the rotating carrier 120 of the first embodiment has no clamping arms such as those described in the second embodiment, its structure is further simplified.

Figure 10:
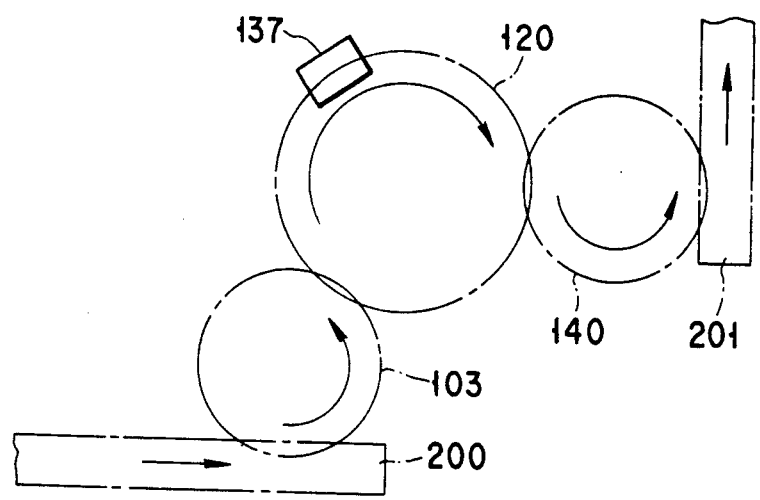
FIG. 10 is a plan view showing a schematic arrangement of another embodiment of the present invention.

In the second embodiment, works are loaded midway along one line conveyor, and weighed works are returned onto the line conveyor. However, for example, works may be loaded from one end side of one conveyor 200 by a first rotating guide member 103, and weighed works may be discharged from a second rotating guide member 140 to another end side of another conveyor 201, as shown in FIG. 10. In addition, works weighed by the weighing conveyor may be directly discharged from the weighing conveyor to another convey path without conveying it by the rotating carrier.

In addition, in the above two embodiments, defective works are selected/removed in the weigher apparatus. However, this removing mechanism may be omitted from the weigher apparatus, and defective works may be removed at a position behind the weigher apparatus.

Furthermore, in the second embodiment, a clamping operation of each clamping arm may be regulated on the basis of a weighing/selection result so that only defective works can be directly discharged from the weighing conveyor to a storage case or the like.

Moreover, in each embodiment described above, the weigher apparatus for weighing cylindrical works is exemplified. However, the present invention can be equally applied to weigher apparatuses for weighing works of different shapes by modifying the shapes of the respective components in accordance with the shapes of works.

As has been described above, the weigher apparatus of the present invention is designed such that a work guided sideways from the conveyor by the loading/guiding mechanism is loaded to one end side of the weighing conveyor by means of the rotating carrier having a convey path which is in contact with the guide path of the loading/guiding mechanism and the convey path of the weighing conveyor.

According to the present invention, therefore, loading of works onto the weighing conveyor can be smoothly performed while falling and swaying of the works are minimized, thereby enabling a weighing operation with higher precision at higher speed than the conventional apparatus.

Additional embodiments of the present invention will be apparent to those skilled in the arm from consideration of the specification and practice of the present invention disclosed herein. It is intended that the specification and examples be considered as exemplary only, with the true scope of the present invention being indicated by the following claims.

What is claimed is:

1. A weigher apparatus comprising:

rotating/conveying means for sequentially receiving can-like objects to be weighed and for conveying the can-like objects along an arcuate path, said rotating/conveying means including:

a rotating/conveying circular plate rotated at a predetermined speed, and having a plurality of notched portions formed in an outer peripheral portion thereof, said notched portions being spaced from each other at a predetermined interval and each said notched portion having a diameter larger than a diameter of each of the can-like objects, an outer guiding member provided along said outer peripheral portion of said rotating/conveying circular plate, and having a diameter larger than an outer diameter of said rotating/conveying circular plate, and an inner guiding member provided along said outer peripheral portion of rotating/conveying circular plate, and having a diameter smaller than the outer diameter of said rotating/conveying circular plate;

said arcuate path being defined by said inner and outer guiding members, said outer and inner guiding members respectively having stepped portions at an intermediate portion of said arcuate path;

the can-like objects being sequentially engaged with inlet portions of said notched portions, and conveyed along said arcuate path, and when the can-like objects reach said intermediate portion having said stepped portions of said outer and inner guiding members, the can-like objects enter the respective notched portions, and are set in a free state out of contact with inner surfaces of the respective notched portions;

straight conveying means for conveying in a substantially straight line the can-like objects which are set in a free state at said intermediate portion of said arcuate path; and weighing means for weighing the can-like objects which are being conveyed in the substantially straight line by said straight conveying means, with the can-like objects again being engaged with said inlet portions of said notched portions and conveyed along said arcuate path after passing through said intermediate portion and being weighed.

2. An apparatus according to claim 1, wherein said outer guiding member has a straight portion which is located at said intermediate portion, so that the can-like objects are sequentially guided inside said notched portions, in said free state.

3. An apparatus according to claim 2, wherein said straight conveying means has a convey speed slightly higher than a rotational speed of said rotating/conveying circular plate, so that the can-like objects are set in said free state.

4. An apparatus according to claim 1, wherein said apparatus further comprises loading means for sequentially loading said can-like objects to be weighed onto one end of said arcuate path at a predetermined interval, said loading means including guiding means for sequentially guiding the can-like objects on a first conveyor to one end of said first conveyor at a predetermined interval along a first guide path which is in contact with said arcuate path and with a convey path of said first conveyor.

5. An apparatus according to claim 4, wherein said apparatus further comprises unloading means for sequentially unloading the can-like objects at a predetermined interval, said unloading means including first unloading means for sequentially conveying the can-like objects which have been weighed along said first guide path and for unloading the can-like objects from an opposite end of said arcuate path onto said first conveyor.

6. An apparatus according to claim 4, wherein said apparatus further comprises unloading means for sequentially unloading the can-like objects at a predetermined interval, said unloading means including second unloading means for unloading and guiding the weighed can-like objects along a second guide path which is in contact with said arcuate path and with a convey path of a second conveyor.

7. An apparatus according to claim 6, wherein said convey path of said first conveyor is substantially perpendicular to said convey path of said second conveyor.

8. An apparatus according to claim 4, wherein said loading means includes a rotating rod having a spiral groove for engaging with the can-like objects.

* * * * *